United States Patent
Yang et al.

(10) Patent No.: US 12,239,959 B2
(45) Date of Patent: Mar. 4, 2025

(54) HIGH-CAPACITY SUPERABSORBENT MATERIALS AND METHODS OF MAKING SAME

(71) Applicant: Kimberly-Clark Worldwide, Inc., Neenah, WI (US)

(72) Inventors: Kaiyuan Yang, Cumming, GA (US); Xuedong Song, Alpharetta, GA (US); Denise V. Taylor, Riverdale, GA (US); Richmond R. Cohen, Appleton, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 18/832,017

(22) PCT Filed: Feb. 28, 2022

(86) PCT No.: PCT/US2022/018141
§ 371 (c)(1),
(2) Date: Jul. 22, 2024

(87) PCT Pub. No.: WO2023/163722
PCT Pub. Date: Aug. 31, 2023

(65) Prior Publication Data
US 2024/0416320 A1   Dec. 19, 2024

(51) Int. Cl.
*B01J 20/26* (2006.01)
*B01J 20/28* (2006.01)
*B01J 20/30* (2006.01)

(52) U.S. Cl.
CPC ....... *B01J 20/267* (2013.01); *B01J 20/28004* (2013.01); *B01J 20/28016* (2013.01); *B01J 20/3021* (2013.01); *B01J 20/3085* (2013.01)

(58) Field of Classification Search
CPC .......... B01J 20/267; B01J 20/28016; B01J 20/33021; B01J 20/3085; B01J 20/28004
USPC .................................................... 252/194
See application file for complete search history.

(56) References Cited

U.S. PATENT DOCUMENTS

| | | | |
|---|---|---|---|
| 4,766,173 A | 8/1988 | Bailey et al. | |
| 6,177,525 B1 * | 1/2001 | McKee | C08F 291/00 526/201 |
| 7,572,874 B2 | 8/2009 | Matyjaszewski et al. | |
| 7,947,794 B2 | 5/2011 | Weismantel et al. | |
| 8,029,824 B2 | 10/2011 | Osada et al. | |
| 10,669,381 B2 | 6/2020 | Lee et al. | |
| 2002/0169252 A1 * | 11/2002 | Wilson | C08F 265/04 526/89 |
| 2010/0035757 A1 | 2/2010 | Furno et al. | |
| 2020/0216623 A1 | 7/2020 | Ahn et al. | |
| 2021/0229070 A1 | 7/2021 | Sohn et al. | |

FOREIGN PATENT DOCUMENTS

| | | |
|---|---|---|
| CN | 1970594 B | 12/2010 |
| CN | 104744711 B | 6/2017 |
| CN | 107501580 B | 5/2020 |
| EP | 0441975 A1 | 8/1991 |
| EP | 2552976 B2 | 5/2019 |
| JP | 2002282687 A | 10/2002 |
| WO | 1995010543 A1 | 4/1995 |
| WO | 2003072153 A2 | 9/2003 |
| WO | 2009029841 A1 | 3/2009 |
| WO | 2011139883 A1 | 11/2011 |

OTHER PUBLICATIONS

International Search Report and Written Opinion for Patent Application No. PCT/US2022/018141 mailed Nov. 18, 2022; 10 pp.
International Preliminary Report on Patentability for Patent Application No. PCT/US2022/018141 mailed Feb. 23, 2024; 5 pp.
Third Party Observation for Patent Application PCT/US2019/057556 submitted Feb. 17, 2022; 12 pp.
Wang, Qinhua et al., "Ultrafast gelling using sulfonated lignin-Fe3+ chelates to produce dynamic crosslinked hydrogel/coating with charming stretchable, conductive, self-healing, and ultraviolet-blocking properties," Chemical Engineering Journal, vol. 396; Sep. 15, 2020; 3 pp.
Buchholz, Fredric L. et al., "Modern Superabsorbent Polymer Technology;" 1998, ISBN 0-471-19411-5; Chapter 7, 4 pp.

* cited by examiner

*Primary Examiner* — Michael M. Bernshteyn
(74) *Attorney, Agent, or Firm* — Armstrong Teasdale LLP

(57) ABSTRACT

Described herein are super absorbent materials (SAMs) and methods of making SAMs. The super absorbent materials are copolymerized with select redox active inorganic salts in a staged polymerization process. The copolymer-based super absorbent materials have significantly improved absorbance properties. The compositions and methods described herein are useful in a variety of absorbent products.

20 Claims, 11 Drawing Sheets

HIGH-CAPACITY SUPERABSORBENT MATERIALS AND METHODS OF MAKING SAME

CROSS-REFERENCE TO RELATED APPLICATION

This application is a U.S. National Phase Application of PCT/US2022/018141 filed Feb. 28, 2022, the content of which is hereby incorporated by reference in its entirety.

FIELD OF DISCLOSURE

This disclosure is directed to super absorbent materials (SAMs) and methods of making SAMs. The SAMs are copolymerized with select redox active inorganic salts in a staged polymerization process. The copolymer-based SAMs have significantly improved absorbance properties. Compositions and methods in accordance with the present disclosure are useful in a variety of absorbent products.

BACKGROUND

Superabsorbent polymers (SAPs) are three-dimensional networks that can absorb and retain water (or other aqueous media) and physiological fluids such as urine and blood more than hundreds times of their own dry weight, typically depending on the ionic concentration of the aqueous solution. SAPs have applications in a variety of fields, including medicine, personal care products, biomaterials, biosorbents, and agriculture. The first commercial SAPs were produced in 1970 through the alkaline hydrolysis of starch-g-polyacrylonitrile. While these polymers could absorb up to 500 g/g of water, they were mechanically weak in their swollen state. SAPs were industrially developed in Japan and USA in the early 1980s for hygienic applications. It was found that SAPs had the potential to replace fluff, making their use in hygienic products such as baby diapers and feminine napkins cost effective.

Desired features of SAPs include high absorption capacity, high and tunable swelling rate, high absorbency under load, good strength of the swollen gel, high gel fraction after crosslinking, excellent durability and stability upon swelling and during storage, non-toxicity, and low cost. Although current hydrogel systems offer good performance in several of these different aspects, several drawbacks exist with various formulations, including low absorbency under pressure, gel blockage (by which the initial layer of SAP forms a relatively impermeable barrier to subsequent water diffusion and uptake deeper into the material), and high sensitivity to the electrolyte solutions. Various strategies have been employed to address these challenges, including forming composite and nanocomposite hydrogels, interpenetrating polymer network (IPN) hydrogels, and various surface treatments: however, improvements are still required to enable the use of minimal material in a broadest possible range of applications.

The nature of monomers and crosslinkers, their concentrations, and molar ratios are known as the most significant factors influencing the absorption capacity of a SAP. Acrylic acid, acrylamide and methacrylic acid are the most extensively-used monomers to prepare SAPs commercially. However, the potential presence of some residual acrylamide in the gels poses a challenge in the practical use of such hydrogels for human health and personal care products. Conversely, the water absorbing and swelling properties of ionic SAPs (e.g. based on acrylic acid or methacrylic acid) are substantially decreased in salt-containing liquids, including physiological fluids like urine and blood. The reason for this salt sensitivity is that the counterions such as sodium ions ($Na^+$) present in physiological fluids can effectively screen the polymer backbone charges, resulting in counterion condensation with polymer-bound charged groups and, consequently, reduced counterion entropy and direct chain-chain repulsion forces available to drive a swelling response.

Conventional SAMs are mainly made of two classes of SAPs: synthetic polymers and natural polymers. In general, synthetic superabsorbent polymers are charged polyelectrolytes such as salts of polyacrylic acid (PAA), polyvinyl sulfonic acid, polyvinyl phosphoric acid, and partially hydrolyzed maleic anhydride copolymers. Natural polymers include both neutral and charged polymers such as carboxymethylcellulose, sodium alginate, chitosan salt and modified starch. All these known SAMs have substantial limitations. For instance, the most widely used commercial PAA-based SAMs have limited absorbency under load (AUL) and are also very salt-sensitive.

The salt sensitivity of SAMs leads to lowered gel swelling capacity. To compensate for the lowered capacity induced by salt sensitivity, more SAM materials are required in personal care garments so that enough absorbing capacity can be guaranteed for preventing leakage. Accordingly, there is a strong need in the personal care industry to improve or overcome the salt sensitivity of conventional SAM materials.

However, SAM salt sensitivity is a challenging problem to address. Although multiple attempts have been made in the art, all of the proposed solutions remain impractical and cost prohibitive. It is well understood in the art that the major portion of the SAM is in its neutralized salt form and traditional thinking is that all these neutralized salt units are considered to be in their fully-ionized form, e.g. metal ions (e.g. $Na^+$) are all free to move around during swelling. It is also known in the art that salts are detrimental to capacity, and the high valent inorganic salts suppress SAM capacity more than monovalent salts such as sodium chloride. Accordingly, past salt sensitivity mitigation work for SAM materials has been mainly focused upon simply using more SAM materials to compensate the capacity loss, removing/reducing salts from physiological fluids such as urine, or trying to design new less salt sensitive structures.

It was described in PCT/US2020/053003 that copolymerization of SAM monomers with select inorganic salts having metal ions with an oxidation state of at least 2 could provide significant increases in CRC performance without detrimental impact to other performance attributes such as AUL. However, those copolymerizations were achieved with non-staged one-pot synthesis procedures. One-pot synthesis procedures are simple for manufacturing, but they have obvious drawbacks for not being able to provide flexibility on controlling/designing SAM polymer chain structures for salt sensitivity mitigation. For example, uniform crosslinking density throughout the gel networks will restrict elastic expansion so that the potential capacity increases resulting from chain charge-charge repulsion will be reduced.

Described herein are SAMs and methods of making SAMs. The SAMs are copolymerized with select redox active inorganic salts in a staged polymerization process. The copolymer-based SAMs have significantly improved absorbance properties due to the increased presence of osmotic free ions. The copolymer-based SAMs also have interpenetrated networks as a result of the staged co-polymerization procedure so that elastic forces that restrict chain expansion can be mitigated. The copolymer-based SAMs also have structural design flexibility, where each stage of polymerization can have its own composition, crosslinking density, etc., which can further enhance the SAM's absorbing capacity while providing unique SAM properties that a traditional uniform PAA-based SAM structure may not be able to offer.

Compositions and methods in accordance with the present disclosure are useful in a variety of absorbent products.

OBJECTIVE OF THE DISCLOSURE

The aim of the present disclosure is to address the salt sensitivity of AA-based SAMs by using staged polymerization techniques.

BRIEF DESCRIPTION OF THE DISCLOSURE

In one aspect, provided herein is a superabsorbent polymer comprising a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, and (iv) optionally an un-neutralized backbone monomer complexed with a coordination complex comprising a metal ion with an oxidation state of at least 2, and optionally a crosslinker; wherein the superabsorbent polymer comprises a non-homogenous microstructure.

In another aspect, provided herein is a method of making a superabsorbent polymer comprising: (i) an initial polymerization stage comprising (ia) forming a mixture comprising a solvent, a monomer, a salt comprising a redox active metal ion, optionally a crosslinker, and an initiator, and (ib) reacting the mixture at a first temperature; and (ii) a final polymerization stage comprising (iia) optionally adding a crosslinker to the mixture; (iib) heating the mixture from the first temperature to a second temperature; and (iic) reacting the mixture at the second temperature.

In yet another aspect, provided herein is a method of using a superabsorbent polymer comprising a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, and (iv) optionally an un-neutralized backbone monomer complexed with a coordination complex comprising a metal ion with an oxidation state of at least 2, and optionally a crosslinker: wherein the superabsorbent polymer comprises a non-homogenous microstructure. The method comprises using the superabsorbent polymer in a consumer product.

DETAILED DESCRIPTION OF THE DISCLOSURE

Figure 1:
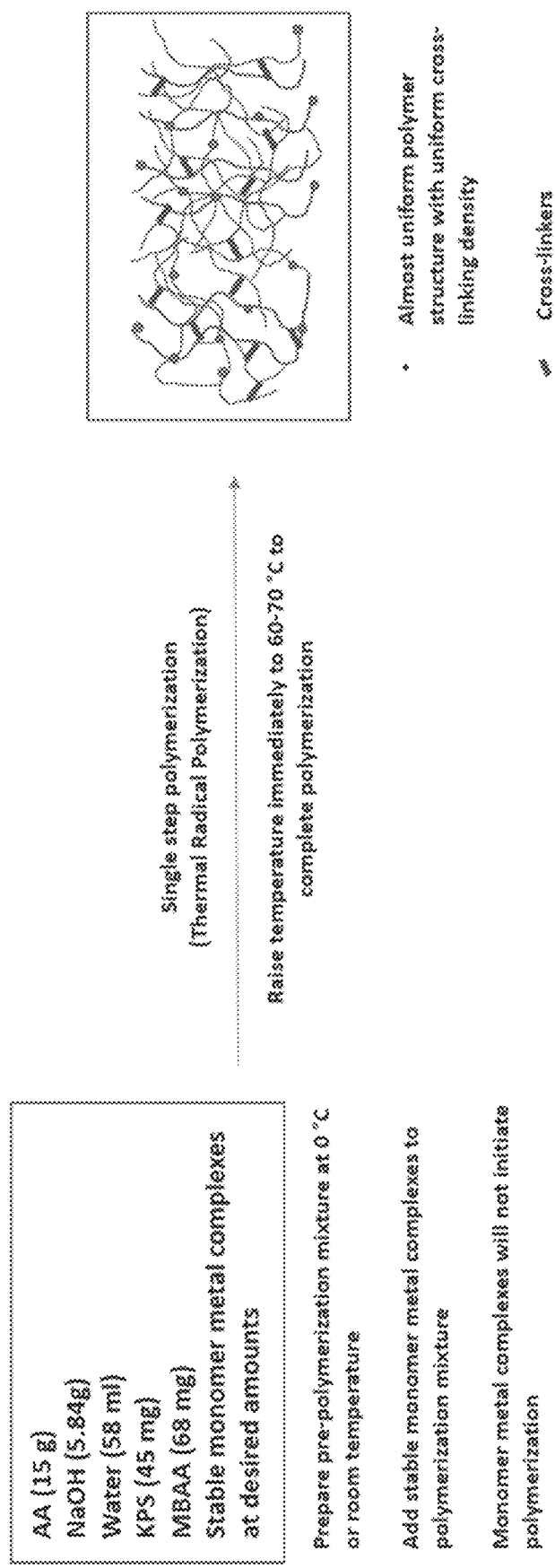
FIG. 1 depicts a conventional process of a non-staged SAM polymerization process including stable salts such as $FeCl_3$.

Superabsorbent polymers produced by copolymerization of SAM monomers with select inorganic salts having metal ions with an oxidation state of at least 2 were described in PCT/US2020/053003, which is incorporated herein by reference. Those copolymerizations were achieved with non-staged one-pot synthesis procedures. One example of a non-staged SAM polymerization process involving stable salts such as $FeCl_3$ is shown in FIG. 1. In the conventional process, a pre-polymerization mixture is prepared at 0° C. or room temperature and stable metal salts are added to the pre-polymerization mixture. These stable metal salts will not initiate polymerization. Rather, a single-step polymerization occurs through a single-step thermal radical polymerization, where the temperature is raised to 60-70° C. and held there to complete polymerization. This results in an almost uniform polymer structure with uniform cross-linking density.

Figure 2:
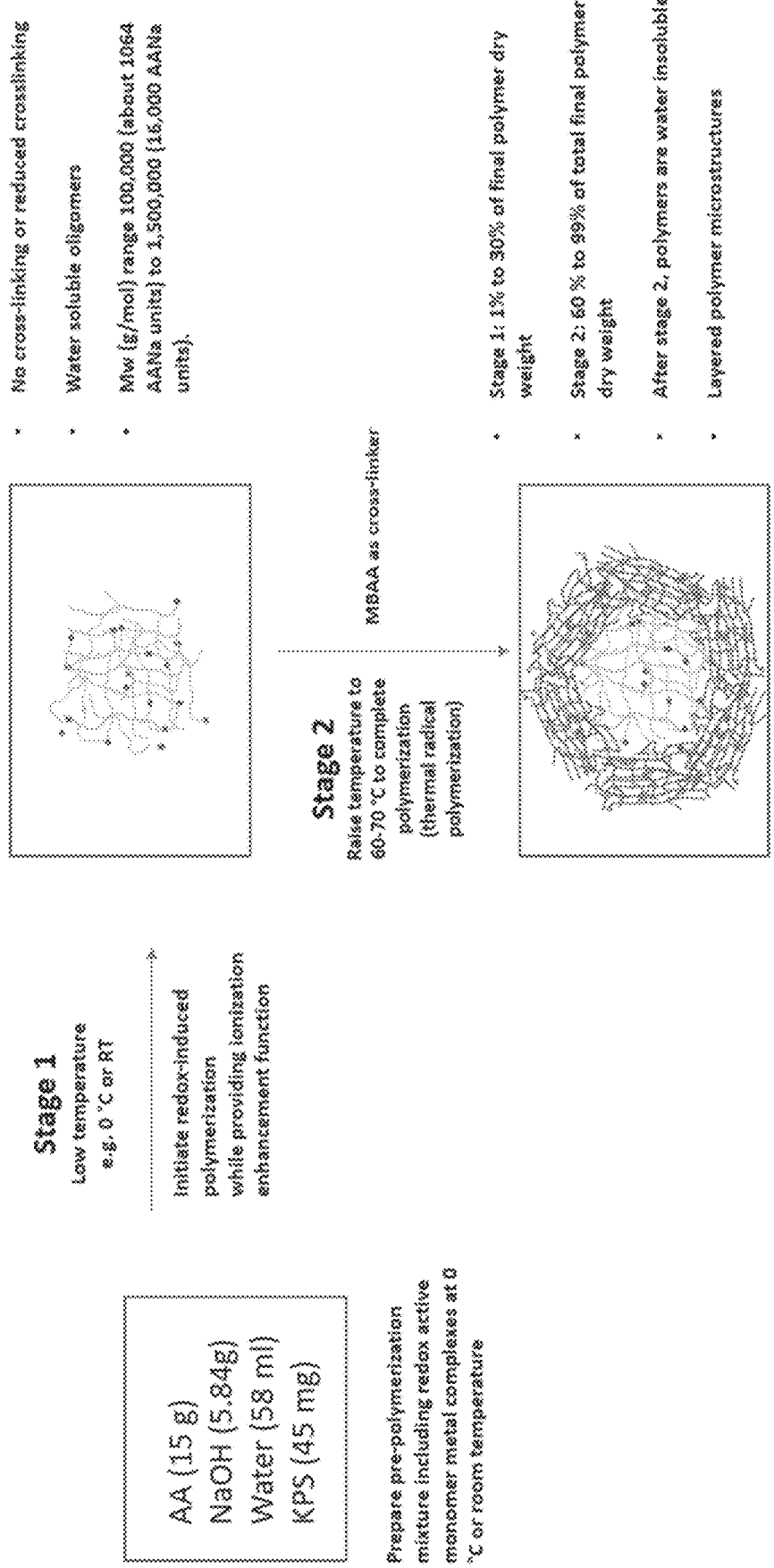
FIG. 2 is an exemplary embodiment in accordance with the present disclosure depicting a $FeCl_2$-induced staged SAM polymerization.

In contrast to non-staged one-pot synthesis procedures and the resulting polymers, the present disclosure is directed to SAMs copolymerized with select redox active inorganic salts in a staged polymerization process. The staged polymerization process is depicted in FIG. 2. This example staged polymerization process has two stages. Generally, in such a two-stage process, a pre-polymerization mixture is prepared at a lower temperature (such as 0° C. and/or from an ice bath) or room temperature. A crosslinker may or may not be added to the prepolymerization mixture. Then a compound having a redox active metal (such as $FeCl_2$) is added to the mixture to initiate the Stage 1 redox-induced polymerization while providing a function of ionization enhancement. This results in water-soluble oligomers. Where no crosslinker was added in the prepolymerization mixture, there will be no crosslinking or reduced crosslinking. A crosslinker may or may not be added to the water-soluble oligomers. Next, a Stage 2 thermal radical polymerization is initiated by raising the temperature to 60-70° C. and holding there to complete polymerization. This results in a polymer comprising a shell-core microstructure, where the Stage 1 oligomers present 1-30% of the final polymer dry weight and the Stage 2 polymers present 60-99% of the final polymer dry weight. After the Stage 2 polymerization, the polymers are water insoluble.

The staged polymerization process according to the present disclosure provides a first function of incorporating a small amount of select inorganic salts (SISs) into mainly PAA-based superabsorbent materials (SAMs) for absorbing capacity enhancement. Further, besides the first capacity enhancement function, the staged polymerization process according to the present disclosure provides a second function of controlling the polymerization process so that the gel properties of SAM polymers can be further improved. In this second function, the SISs will be part of the polymerization initiation step and must be redox active. In other words, the SISs must be capable of being oxidized from a lower oxidation state (e.g. $M^{n+}$) to a higher oxidation state (e.g. $M^{n+1}$) when they react with a proper radical polymerization initiator (e.g. KPS) to start the polymerization process. By initiating the polymerization process, the oxidized metal ion form (e.g. $M^{n+1}$) will be incorporated into the polymer chain by complexation to provide the source of the ionization enhancement. Non-redox active salts can still be added for the purpose of ionization enhancement, but they will not initiate polymerization.

The controlling of the polymerization means that the secondary function of a redox active SIS will allow the polymerization process to proceed by following pre-designed stages such as Stage 1, Stage 2, Stage 3, and so on. Stage 1 is the polymerization initiation step, and its polymerization parameters can be the same or different compared to other stages. The polymerization parameters here include, but are not limited to, temperature, time, oxygen levels, crosslinkers, initiators, monomer or monomers, concentrations of each monomer, initiator, crosslinker (e.g. loading levels), and any specially-designed reaction-related sequences (e.g. addition sequences of monomers or initiators or cross-linkers, etc.). For example, Stage 1 may or may not need a crosslinker so that polymer networks formed in this step can be mostly long chain polymers without chemical bond-based crosslinking. In another example, Stage 1 and Stage 2 may both have crosslinkers but will require two different temperatures and different polymerization times to complete their respective polymerization processes.

The polymer networks formed from different stages according to the present disclosure are not independent. Instead, polymer networks formed in different stages are inter-connected by either chemical crosslinking, by physical chain-to-chain entanglements, or by chain charge-charge interactions or alike. In some cases, such interconnections may lead to layered network structures, while in other cases, the overall structure may be more like interpenetrated networks because certain portions of networks from different stages are effectively intertwined together through chemical cross-linking, charge-charge interactions, and physical entanglements.

In a general embodiment with acrylic-based monomers as an example, the select inorganic salts (SISs), including redox active salts, can be added to acrylic acid (AA) or partially neutralized AA solutions to allow SISs to form AA-SIS and AANa-SIS complexes before polymerization. After complex formation, a conventional polymerization procedure is carried out to form the desired sample materials. Alternatively, SISs can be added to the polymerization procedure as the last reagent, and this can prevent premature polymerization initiation if they are added to monomers first. Additionally, SISs can be added portion-wise in each stage or in different stages at desired ratios. The preferred loading ranges of SISs can vary, but generally will not exceed 1% of the weight of the monomers involved.

The general structure of the SAM materials for the present disclosure can be described as a staged overall network with each stage having its own subnetwork:

[Network]$_{Stage1}$[Network]$_{Stage2}$ ... [Network]$_{Stagex}$[Network]$_{stagex1}$ ...

Generally, the number of stages can be any suitable number of stages known in the art. The number of stages can be one, two three, four, five, or more than five. Preferably, the total number of stages should be controlled below five, and most preferably below three.

Networks in different stages can be in any desired ratios and can be controlled by changing the polymerization parameters as described above. In some embodiments, one stage will be dominant. In some embodiments, the stages are evenly divided. In some embodiments, the transition from one stage to the next is considered a separate stage as the transition can be time-dependent or temperature-dependent or alike. For example, it will take time for a polymerization mixture to transit from one temperature to another temperature as raising temperature can take time (e.g. continuous or pre-prepared temperature baths).

Because of the complexity of precisely defining the exact network structure for each polymerization stage, the present disclosure adopts a simplified approach to define the final polymer's composition by using the total loading levels of each monomer and also each monomer's SIS-complexed form. For example, if the staged polymerization involves two monomers and one redox SIS salt, the composition of the final polymer can be described as [(Monomer1)$_x$(Monomer1-SIS)$_y$(Monomer2)$_z$(Monomer2-SIS)$_w$], in which x, y, z, w, are either the molar ratios or weight ratios of each component. The combined Y and W ratios are generally capped at less than 1% of (x+y+z+w) in terms of weight ratios. In one specific example, with two monomers of acrylic acid and acrylic acid sodium salt, the composition of the staged co-polymer can be described as [(AA)$_x$(AA-SIS)$_y$(AANa)$_z$(AANa-SIS)$_w$], in which x, y, z, w, are either the molar ratios or weight ratios of each monomer and their SIS-complexed form.

In many embodiments, superabsorbent polymers according to the present disclosure comprise a polymer backbone comprising (i) a neutralized backbone monomer, (ii) a neutralized backbone monomer complexed with a coordination complex comprising a metal ion with an oxidation state of at least 2, (iii) optionally an un-neutralized backbone monomer, and (iv) optionally an un-neutralized backbone monomer complexed with a coordination complex comprising a metal ion with an oxidation state of at least 2, and optionally a crosslinker, wherein the superabsorbent polymer comprises a non-homogenous microstructure.

In some embodiments, the superabsorbent polymer comprises a plurality of polymer portions, wherein each polymer portion is produced in a different stage of polymerization. In some embodiments, the superabsorbent polymer comprises a first polymer portion and a second polymer portion, wherein the first polymer portion and the second polymer portion are produced in different stages of polymerization.

In some embodiments, the superabsorbent polymer comprises a first polymer portion present in an amount in the range of from about 1 to about 40 weight percent of the superabsorbent polymer and a second polymer portion present in an amount in the range of from about 60 to about 99 weight percent of the superabsorbent polymer. In some embodiments, the superabsorbent polymer comprises a first polymer portion present in an amount in the range of from about 1 to about 30 weight percent of the superabsorbent polymer and a second polymer portion present in an amount in the range of from about 60 to about 99 weight percent of the superabsorbent polymer.

Generally, the superabsorbent polymer may comprise any suitable non-homogenous microstructure known in the art. The non-homogenous microstructure results in a non-homogenous polymer structure. In some embodiments, the superabsorbent polymer comprises a non-homogenous microstructure selected from the group consisting of a layered polymer structure with domains from different stages, a core-shell polymer structure comprising a core from one stage and a shell from another stage, interpenetrated networks with one stage as one network and another stage as another network, and combinations thereof.

Figure 3A:
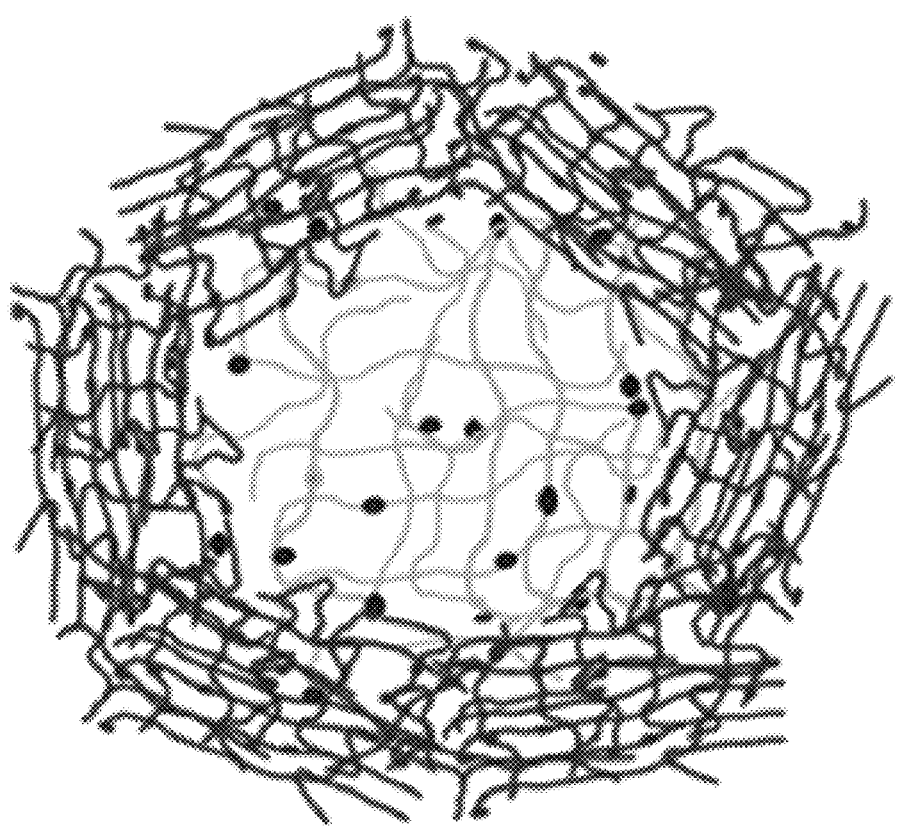
FIG. 3A is an exemplary embodiment in accordance with the present disclosure depicting a two-dimensional view of a polymer microstructure produced by $FeCl_2$-induced staged SAM polymerization.
Figure 3B:
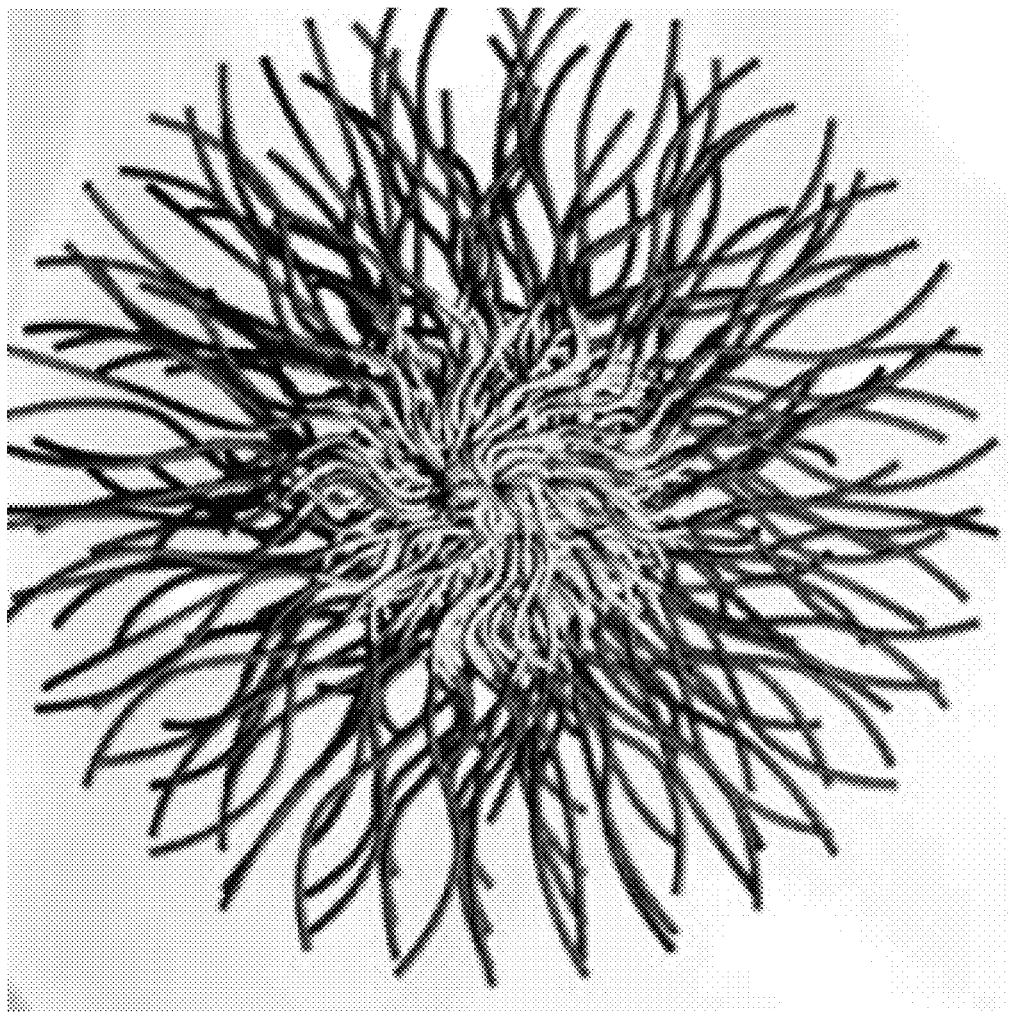
FIG. 3B is an exemplary embodiment in accordance with the present disclosure depicting a three-dimensional view of a polymer microstructure produced by $FeCl_2$-induced staged SAM polymerization.

One example core-shell polymer microstructure is shown in a two-dimensional view in FIG. 3A and in a three-dimensional view in FIG. 3B.

Generally, the superabsorbent polymer may comprise any suitable crosslinking density known in the art. In some embodiments, the superabsorbent polymer comprises a non-homogenous crosslinking density. In some embodiments, the superabsorbent polymer comprises a first polymer portion comprising a first crosslinking density and a second polymer portion comprising a second crosslinking density, wherein the first crosslinking density and the second crosslinking density are different. In some embodiments, the superabsorbent polymer comprises a first polymer portion comprising no crosslinking or minimal crosslinking and a second polymer portion comprising a high degree of crosslinking.

Generally, the superabsorbent polymer possesses unique absorption properties compared to conventional superabsorbent polymers. In some embodiments, the superabsorbent polymer is configured to provide at least a 5.2% reduction in storage modulus (G') between 300 seconds and 500 seconds after exposure to a 0.9% NaCl solution at room temperature. In contrast, polymers not produced by staged polymerization do not exhibit such a large reduction in storage modulus (G') under identical testing conditions.

Generally, the superabsorbent polymer is copolymerized from select inorganic salts, a neutralized monomer, an un-neutralized monomer, and optionally a crosslinker. This copolymerized superabsorbent polymer mitigates salt sensitivity to provide significant increases in CRC performance without detrimental impact to other performance attributes such as AUL. Higher AUL can also be reached if the gel strength of the SAMs according to the present disclosure can be enhanced by using well-known techniques such as surface crosslinking of the said SAM particles.

Figure 6:
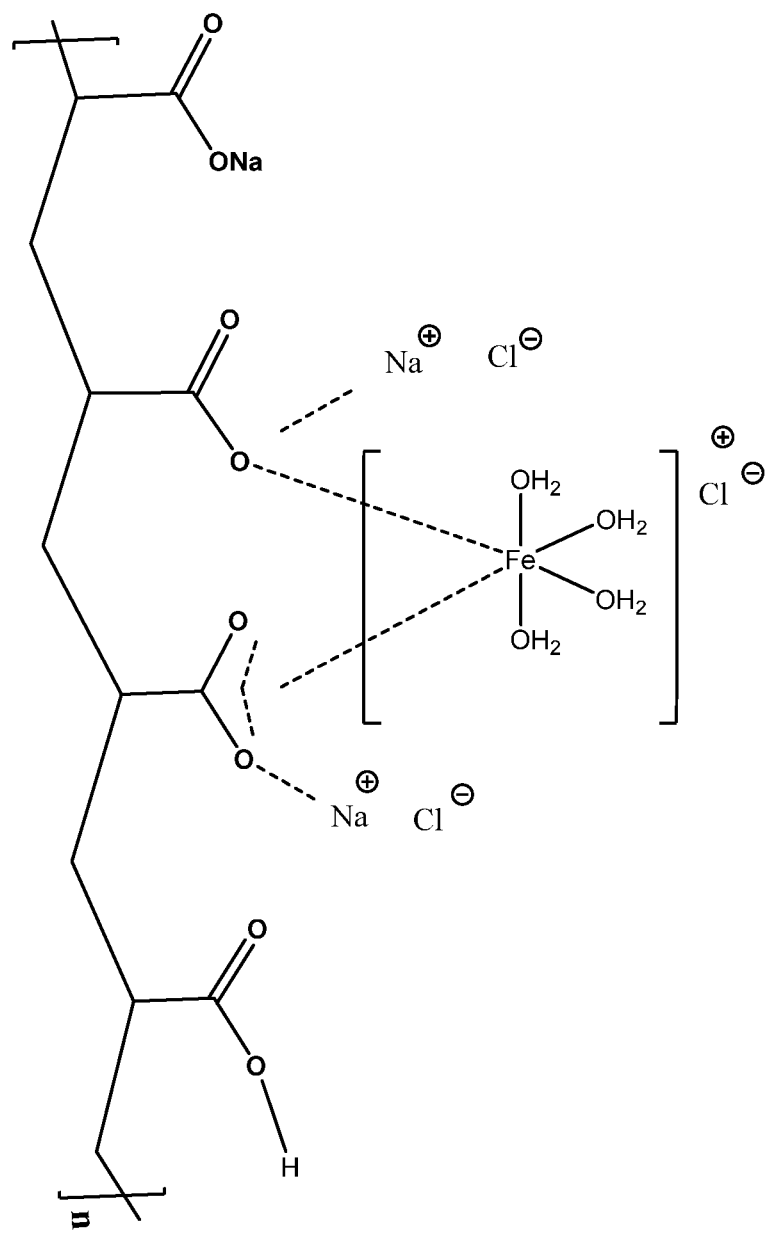
FIG. 6 is an exemplary embodiment in accordance with the present disclosure depicting select inorganic salts for increased ionization.
Figure 7:
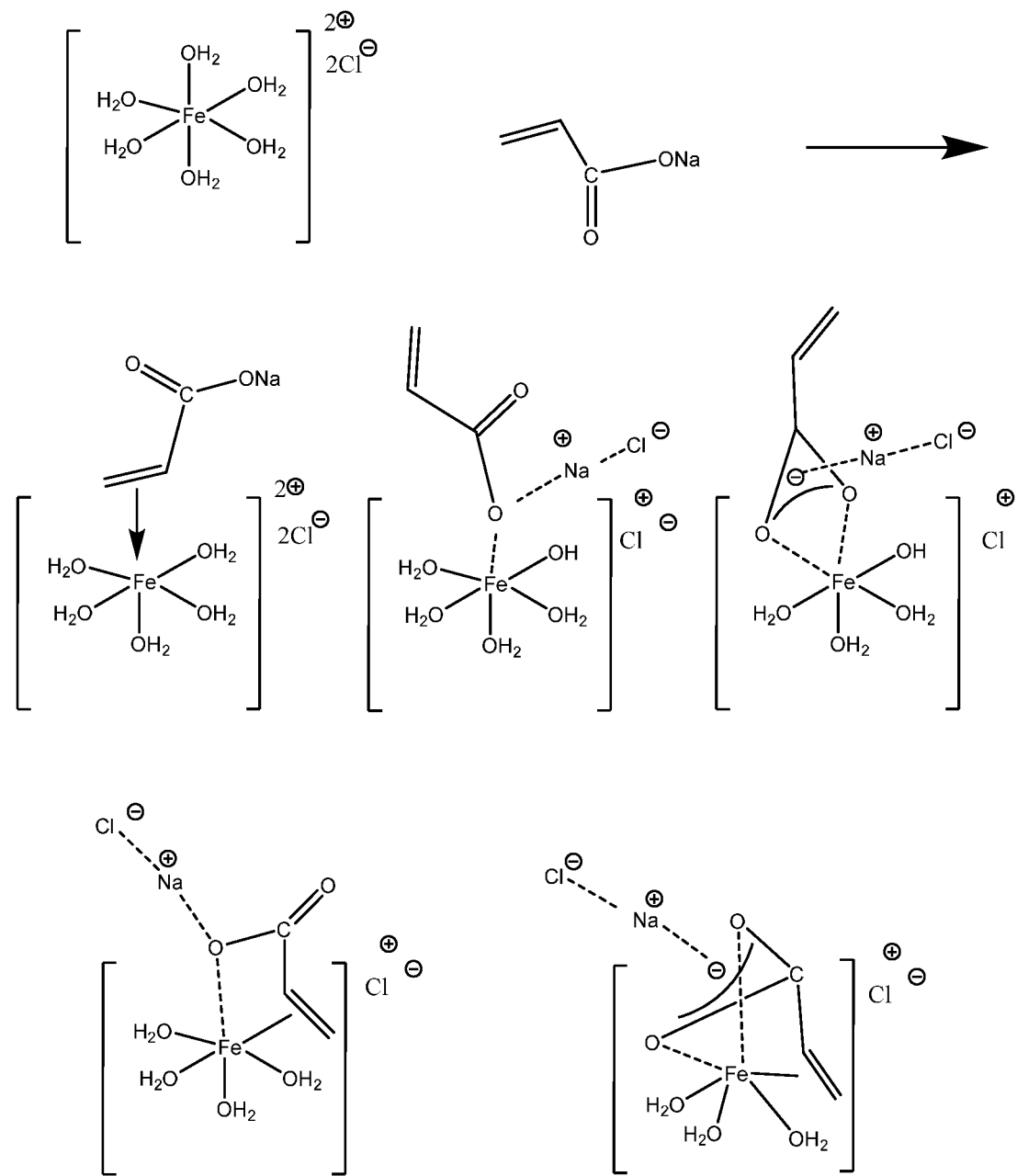
FIG. 7 is an exemplary embodiment in accordance with the present disclosure depicting a single iron (II) complex before polymerization.
Figure 8:
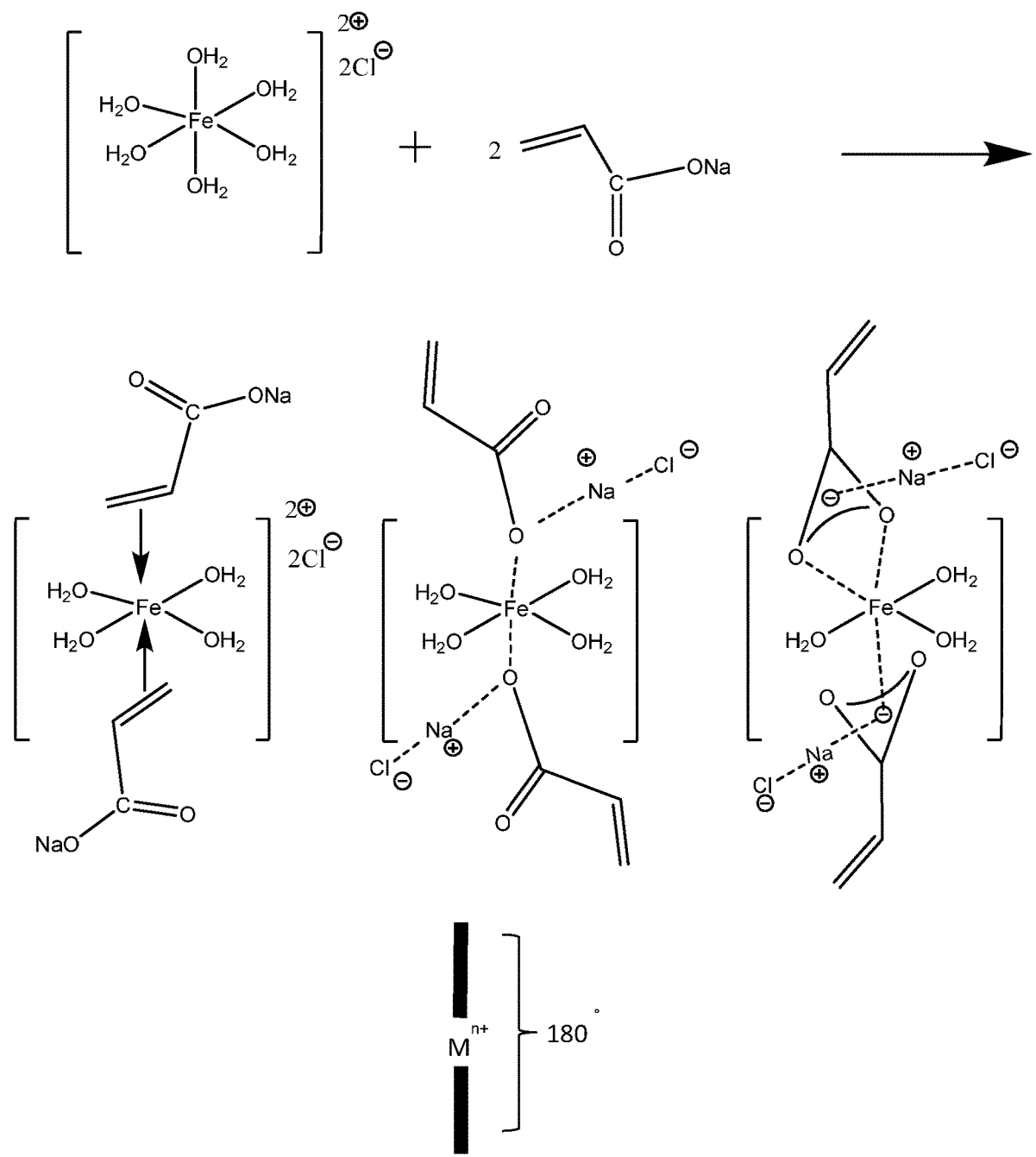
FIG. 8 is an exemplary embodiment in accordance with the present disclosure depicting coordination modes of two iron (II) complexes before polymerization.
Figure 9:
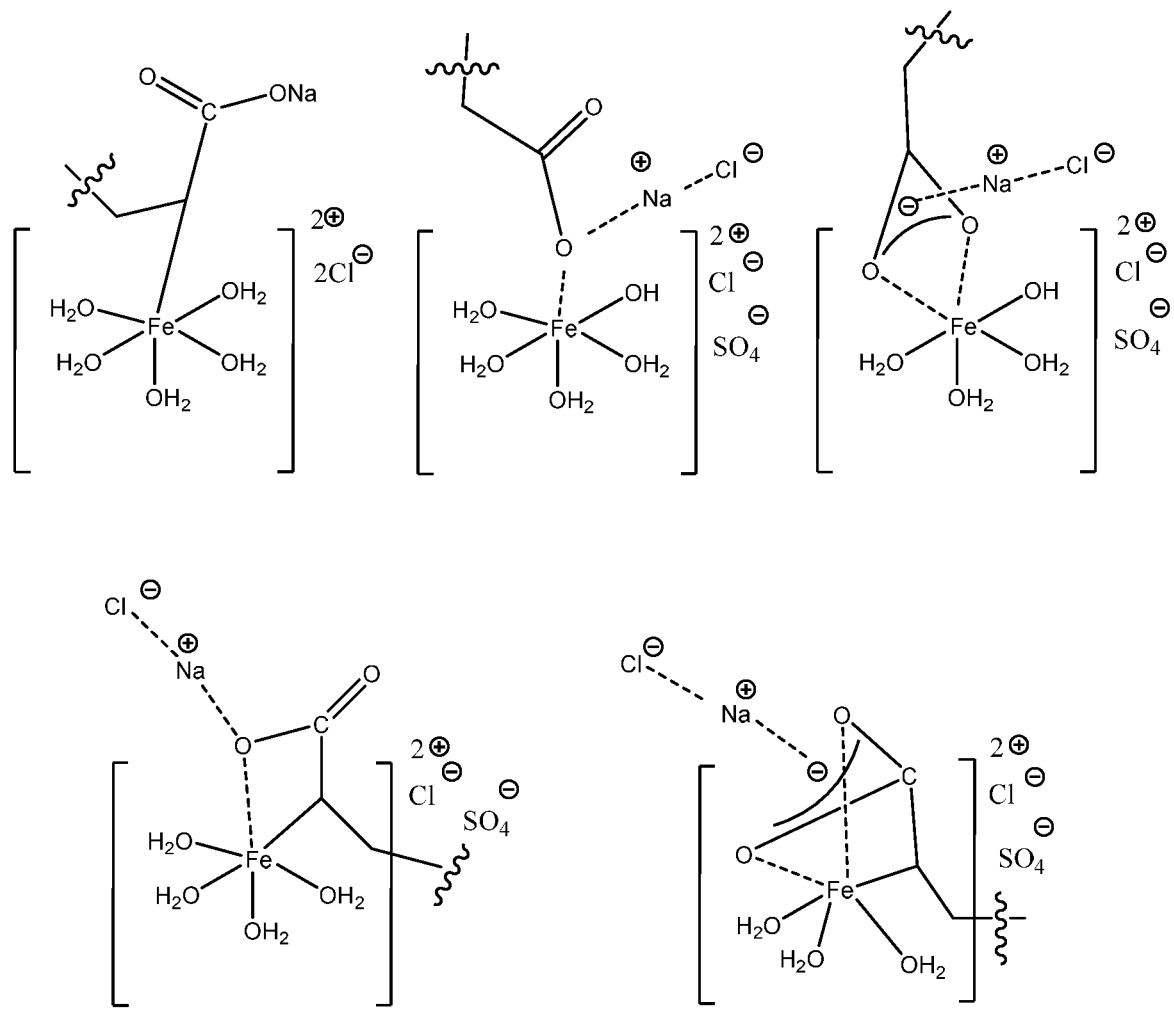
FIG. 9 is an exemplary embodiment in accordance with the present disclosure depicting potential AANa-SIS units formed from a single iron (II) complex in the polymerized networks.
Figure 10:
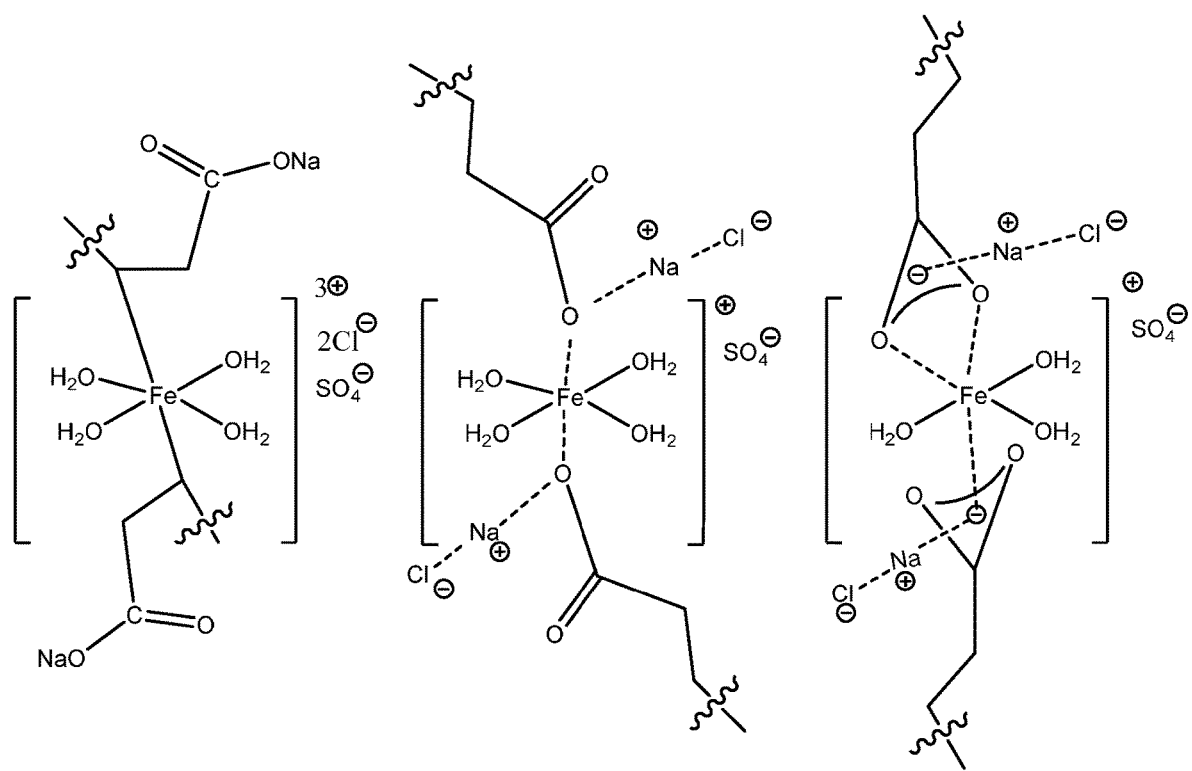
FIG. 10 is an exemplary embodiment in accordance with the present disclosure depicting potential AANa-SIS units formed from a bidentate iron (II) monomer complex in the polymerized networks.

The metal ion with an oxidation state of at least 2 may have an oxidation state of at least 2, of at least 3, or of at least 4. The use of stable select inorganic salts comprising such metal ions is based on a critical discovery in the analysis of the interactions of metal salts and SAM polymer chain ion pairs. There is a major difference when a metal salt, particularly metals salts when the metal ion's oxidation state in the salt is higher than two, interacts with the SAM's polymer chain from an external solution and when the same salt is introduced to the polymer chain by forming a metal complex with a monomer before the polymerization. In the former case, the salt approaches the polymer chain's ion pairs as "external" ions and they primarily function as both chain charge screeners (mono counter ions such as $Na^+$ and high oxidation ions such as $Ca^{2+}$ and $Al^{3+}$) and chelating cross-linkers (high oxidation ions such as $Ca^{2+}$, $Al^{3+}$, etc). The screening and chelating effects are much more profound for high oxidation metal ions as they will accumulate on the SAM particle's outer-layers so that the elastic portions of SAM swelling will be significantly restricted and reduced. However, for the latter case, the same high oxidation metal ions, when they first form a complex with a monomer such as AA or AANa and then are polymerized, may actually help to generate more free ions for the polymer chain and thus increase the SAM absorbency, as shown in FIG. 6. This observation is in agreement with the osmotic pressure theory that the osmotic pressure is directly proportional the total particle counts in a gel system.

These complexed salts are termed "internal" or "intrinsic" metal salts and metal ions.

However, even though SAM absorbency may be increased, too many internal salts may still be detrimental to the SAM absorbency as they can also function as cross-linkers through chelation. As such, the absorption benefits can only be achieved and be effective for increasing SAM capacity when the chelation between polymer chains is minimized during polymerization. For this to occur, the loading levels of metal salts for forming complexes must be managed so that the ionization can be maximized while the crosslinking can be minimized. Additionally, only select salts having metals with oxidation states higher than two may be suitable in the present disclosure as stable select inorganic salts. This is because high oxidation state salts are more advantageous in forming more free ions than salts with lower oxidation state metal ions. More specifically, metal ions with oxidation states of two (i.e. $M^{2+}$) are more advantageous in stable select inorganic salts than metal ions with oxidation states of one (i.e. $M^+$), and metal ions with oxidation states of three or higher (i.e. $M^{\geq 3+}$) are more advantageous than metal ions with oxidation states of two (i.e. $M^{2+}$).

Since very few metal ions are stable when the oxidation state is higher than three, preferred salts are ones with metal ions having an oxidation state of at least three. Some of the salts with $M^{3+}$ may still not be suitable in the present disclosure if they are prone to forming chelating structures in the aqueous solutions or in polymerization mixtures.

Many inorganic salts have metal ions with oxidation states higher than 2 (i.e. metal halides, sulfates, and nitrates), and could be used to demonstrate the benefits of the present disclosure. However, most of these salts are not readily available and present safety issues in personal care applications. Accordingly, the stable metal ions demonstrated herein are commonly found in nature and are associated with biological-related processes. Thus, they are safe or considered to be safe in at least some personal care applications. Regardless, the present disclosure is not intended to be limiting and any inorganic salt having a metal ion with an oxidation state of at least two could be used in the present disclosure as a stable select inorganic salt.

The stable select inorganic salts in accordance with the present disclosure include metal ions that can form coordination complexes with monomers in the pre-polymerization mixture: these structures will be part of the SAM's polymer chain or chain networks after copolymerization. The stable select inorganic salts are non-redox active salts that contribute to ionization enhancement, but will not initiate polymerization.

The structures of the coordination complexes depend in part on the coordination number of the metal ion. The coordination number of a metal is largely dictated by how many donor atoms can fit around the metal, which in turn is controlled by size. Regarding transition metals, the later transition metals are smaller than the earlier ones. On crossing the 3d transition series, nuclear charge and atomic number increase, but the screening due to filled electronic shells stays the same. This draws the outer electrons in closer, so that the atoms and ions become progressively smaller. For zinc, the last and smallest of the 3d metals, four is the most common coordination number. Thus, later transition metals generally form smaller complexes than earlier transition metals.

In some embodiments, the coordination complex comprising a metal ion with an oxidation state of at least 2 coordinates with more than one neutralized or un-neutralized backbone monomer. It is conceivable that a monomer complex with more than one neutralized or un-neutralized backbone monomer or combinations thereof can start one or two or more polymer chains. Because of these geometry restrictions by the coordinated metal center ion, the SAM materials with such structures will lead to more advantageous gel properties such as improved gel rigidity and mechanical properties.

As depicted in FIGS. 7-10, the coordination modes between a monomer and a selected salt can have two major modes, e.g. one is the coordination between the monomer's alkene double bond and a metal center while another one is the coordination between the carboxylate side of the monomer and a metal center. The coordination between the carboxylate and a metal center is more complex compared to alkene double bond coordination because it can assume different modes. It is conceivable that such different coordination modes can form before the polymerization at the monomer complex stage and some of such initial simple complexes can form more complexed structures during the polymerization process and even later stages, such as during the drying processes. It is also conceivable that such different interactions can happen within a single polymer chain or among different chains to form a network. For the purpose of ionization enhancement, the network formation through different chains here is not desirable and should be minimized as it will function as a cross-linking agent for cancelling the ionization.

Because the formation of the different coordination modes and different selected metal salts may prefer one or more modes over others, it should be understood here that those skilled in the art can fine-tune polymerization and processing conditions for a given selected salt so that the maximized capacity enhancement can be reached. It is also conceivable that in some cases, CRC enhancement may be more profound, like the polymerization conditions of the present disclosure, than AUL enhancement. In other cases, AUL enhancement may be more profound than CRC increases. In still other cases, both CRC and AUL increases can be achieved.

Transition metals are particularly advantageous in the present disclosure because of their numerous oxidation states and coordination complexes. In some embodiments, the coordination complex comprises a metal ion selected from the group consisting of transition metals. Preferably, the coordination complex comprises a metal ion selected from the group consisting of row 1 and row 2 transition metals. The most preferred transition metal ions are selected from the group consisting of row 1 transition metals and combinations thereof.

In some embodiments, the coordination complex comprises a metal ion selected from the group consisting of $Ca^{2+}$, $Co^{2+}$, $Zn^{2+}$, $Mn^{2+}$, $Al^{3+}$, $Fe^{3+}$, $Co^{3+}$, $Mn^{3+}$, and combinations thereof. In some embodiments, the coordination complex comprises a complex selected from the group consisting of $ML_x^{2+}$, $ML_x^{3+}$, and combinations thereof, wherein L is an organic ligand and M is a metal ion selected from the group consisting of $Ca^{2+}$, $Co^{2+}$, $Zn^{2+}$, $Mn^{2+}$, $Al^{3+}$, $Fe^{3+}$, $Co^{3+}$, $Mn^{3+}$, $Ru^{3+}$, and combinations thereof.

The coordination of organic ligands to metal centers can significantly alter the oxidation potentials of the said metal center so that the polymerization conditions can be changed to accommodate more redox sensitive metal centers. The use of organic ligands may be particularly useful for stabilizing some very unstable metal salts such as $Co^{3+}$ and $Mn^{3+}$ so that they can be used as stable salts like $Fe^{3+}$. The suitable organic ligands (e.g. L) may include, but are not limited to, monodentated, bidentated, and multipledentated ligands such as those commonly used in inorganic/organic/organometallic chemistries. Specific examples include $OR_2$, $NR_3$, $PR_3$, $OR_2(CH_2)_nOR_2$. $NR_2(CH_2)_nNR_2$, $PR_2(CH_2)_nPR_2$, etc. where R is an alkyl group selected from the group consisting of methyl, ethyl, butyl, and combinations thereof.

In some embodiments, the coordination complex comprising a metal ion with an oxidation state of at least 2 coordinates with more than one neutralized or un-neutralized backbone monomer. Coordination with more than one neutralized or un-neutralized backbone monomer can occur along the same or different polymer chains.

Stable select inorganic salts that are non-redox active can also be added for the purpose of ionization enhancement, but they will not initiate polymerization. An especially preferred stable select inorganic salt is $FeCl_3$. $FeCl_3$ is particularly effective and inexpensive. $FeCl_3$ exists in a number of hydrated coordinated complex forms in water. The hydrated forms can form monodentate complexes, bidentate complexes, and even higher multidentate complexes from monomers and they can be retained and become the source units for more free ions in polymerized SAMs (FIGS. 7-10). As depicted and described herein, the select inorganic salts can improve the salt sensitivity of SAMs through a variety of mechanisms, mainly through increase the free ions when they are directly incorporated into the SAM's polymer chains and chain networks as intrinsic internal salts.

Although not specifically targeted, the SAMs with metal ions might have other advantageous properties over SAMs without coordinated metal ions. For example, charged metal centers are well-known for trapping or killing bacteria, and such properties are extremely desirable for personal garments such as diapers and pants and feminine pads. In another aspect, metal ions are also known to absorb various odor molecules such as ammonia, amines, and sulfur compounds. These odor compounds are well known to be present in physiological fluids such as in urine, blood, sweat, etc. In a further aspect of the disclosure, the metal ions in the polymer chains and chain networks can function as the starting points of degradation for faster decomposition in nature or an engineered process that can accelerate the decomposition process such as by light radiation (e.g. commonly known as an OXO-biodegradation process). As such, SAMs with coordinated metal ions might be advantageous over other SAMs at least for their better biodegradability.

Generally, the neutralized backbone monomer is present in an amount in the range of from about 50 to about 99 mol % of the superabsorbent polymer, the neutralized backbone monomer complexed with a coordination complex comprising a metal ion with an oxidation state of at least 2 is present in an amount in the range of from about 0.001 to about 0.3 mol % of the superabsorbent polymer, the un-neutralized backbone monomer is present in an amount in the range of from about 0 to about 40 mol % of the superabsorbent polymer, and the un-neutralized backbone monomer complexed with a coordination complex comprising a metal ion with an oxidation state of at least 2 is present in an amount in the range of from about 0.001 to about 0.3 mol % of the superabsorbent polymer. Larger amounts of the neutralized backbone monomer complexed with a coordination complex comprising a metal ion with an oxidation state of at least 2 can lead to detrimental effects in the superabsorbent polymer. In some embodiments, the preferred total amount of neutralized and unneutralized monomers with coordinated selected salts are in the range of from about 0.01 mol % to about 0.3 mol % of the end polymer.

In some other embodiments, the preferred total amount of neutralized and unneutralized monomers with coordinated selected salts are in the range of from about 0.01 mol % to about 0.15 mol % of the end polymer. In some further embodiments, the preferred total amount of neutralized and unneutralized monomers with coordinated selected salts are in the range of from about 0.01 mol % to about 0.1 mol % of the end polymer. In some other embodiments, the preferred total amount of neutralized and unneutralized monomers with coordinated selected salts are in the range of from about 0.01 mol % to about 0.05 mol % of the end polymer.

In some embodiments, the neutralized backbone monomer is present in an amount greater than about 50 mol %, 55 mol %, 60 mol %, 65 mol %, 70 mol %, 75 mol %, 80 mol %, 85 mol %, 90 mol %, 95 mol %, 96 mol %, 97 mol %, or 98 mol % of the superabsorbent polymer.

In some embodiments, the un-neutralized backbone monomer is present in an amount greater than about 0 mol %, 5 mol %, 10 mol %, 15 mol %, 20 mol %, 25 mol %, 30 mol %, 35 mol %, 36 mol %, 37 mol %, 38 mol %, or 39 mol % of the superabsorbent polymer.

In some embodiments, the sum of the wt % of the neutralized backbone monomer complexed with a coordination complex comprising a metal ion with an oxidation state of at least 2 and the wt % of the un-neutralized backbone monomer complexed with a coordination complex comprising a metal ion with an oxidation state of at least 2 is less than about 0.2%, less than about 0.075%, less than about 0.050%, and less than about 0.025%, and less than 0.01% of the total wt % of the polymer backbone.

The superabsorbent polymer can take a variety of forms depending on the ultimate application. In some embodiments, the superabsorbent polymer is in a form selected from the group consisting of a particle, a gel, a fiber, a bead, a liquid, a solid, a paste, or combinations thereof. In some particular embodiments, the superabsorbent polymer is a gel or a particle, and preferably in the form of particles.

In some embodiments, the superabsorbent polymer is in a form with a diameter in the range of about 100 µm to about 1000 µm, about 100 µm to about 900 µm, about 100 µm to about 800 µm, about 100 µm to about 700 µm, about 100 µm to about 600 µm, about 100 µm to about 500 µm, about 100 µm to about 400 µm, about 100 µm to about 300 µm, or about 100 µm to about 200 µm. In some embodiments, the superabsorbent polymer is in a form with a diameter in the range of about 200 µm to about 900 µm, about 300 µm to about 800 µm, about 300 µm to 600 µm, about 400 µm to about 700 µm, or about 500 µm to about 600 µm.

In some particular embodiments, the superabsorbent polymer is in a form with a diameter in the range of about 300 µm to about 600 µm.

In many embodiments, the superabsorbent polymer exhibits substantially improved absorbency and salt sensitivity properties without crosslinking. However, crosslinkers may be used to further enhance the properties of the superabsorbent polymers. The superabsorbent polymer may comprise one, two, or more crosslinkers.

In some embodiments, the superabsorbent polymer comprises a crosslinker selected from the group consisting of methylene (bis) acrylamide (MBAA), poly (ethylene glycol diacrylate) (PEGDA), ethylene glycol diacrylate (EGDA), ethylene glycol dimethacrylate (EGDMA), poly (ethylene glycol dimethacrylate) (PEGDMA), and combinations thereof.

In some embodiments, the superabsorbent polymer comprises a polymer portion that is lightly crosslinked. In some embodiments, the superabsorbent polymer comprises a polymer portion that has a crosslinker density in the range of about 0.1 mol % to about 2.0 mol %. In some embodiments, the superabsorbent polymer comprises a polymer portion that has a crosslinker density in the range of about 0.2 mol % to about 2.0 mol %. In some embodiments, the superabsorbent polymer comprises a polymer portion that has a crosslinker density in the range of about 0.5 mol % to about 2.0 mol %. In some embodiments, the superabsorbent polymer comprises a polymer portion that has a crosslinker density in the range of about 1.0 mol % to about 2.0 mol %. In some embodiments, the superabsorbent polymer comprises a polymer portion that has a crosslinker density in the range of about 1.5 mol % to about 2.0 mol %.

The neutralized backbone monomer and the un-neutralized backbone monomer are each individually selected according to the ultimate application of the superabsorbent polymers. Monomers known in the art to be used in superabsorbent polymers are suitable as the neutralized backbone monomer and the un-neutralized backbone monomer. The neutralized backbone monomer and the un-neutralized backbone monomer may be neutralized and un-neutralized forms of the same monomer or neutralized and un-neutralized forms of different monomers.

In some embodiments, the neutralized backbone monomer and the un-neutralized backbone monomer are each individually selected from the group consisting of acrylic acids, methacrylic acids, vinyl sulfonic acids, vinyl phosphoric acids, partially hydrolyzed maleic anhydrides, and combinations thereof.

Also disclosed herein is a method of making a superabsorbent polymer comprising (i) an initial polymerization stage comprising (ia) forming a mixture comprising a solvent, a monomer, a salt comprising a redox active metal ion, optionally a crosslinker, and an initiator; and (ib) reacting the mixture at a first temperature; and (ii) a final polymerization stage comprising (iia) optionally adding a crosslinker to the mixture: (iib) heating the mixture from the first temperature to a second temperature; and (iic) reacting the mixture at the second temperature.

The salt comprising a redox active metal ion is part of the polymerization initiation step. The redox active metal must be capable of being oxidized from a lower oxidation state (e.g. $M^{n+}$) to a higher oxidation state (e.g. $M^{n+1}$) when reacted with a proper radical polymerization initiator (e.g. KPS) to start the polymerization process. By initiating the polymerization process, the oxidized metal ion form (e.g. $M^{n+1}$) will be incorporated into the polymer chain by complexation to provide the source of the ionization enhancement. Non-redox active salts can still be added for the purpose of ionization enhancement, but they will not initiate polymerization.

In some embodiments, the salt comprising a redox active metal ion comprises a metal ion selected from the group consisting of $Co^{2+}$, $Mn^{2+}$, $Al^{2+}$, $Fe^{2+}$, $Co^{2+}$, $Mn^{3+}$, $Ru^{2+}$, and combinations thereof. Generally, the salt may comprise any suitable salt anion known in the art. In some embodiments, the salt comprises an anion selected from the group consisting of $CL^-$, $SO_4^{2-}$, $NO_3^-$, $BF_4^-$, and combinations thereof.

An especially preferred redox active metal salt is $FeCl_2$. $FeCl_2$ is particularly effective and inexpensive. $Fe^{2+}$ is oxidized to $Fe^{3+}$ during polymerization.

In some embodiments, the redox active metal ion is oxidized to an oxidized metal ion selected from the group consisting of $Co^{3+}$, $Al^{3+}$, $Fe^{3+}$, $Co^{3+}$, $Mn^{3+}$, and combinations thereof.

In some embodiments, the mixture further comprises a stable salt comprising a metal ion with an oxidation state of at least 2.

In some embodiments, the method further comprises at least one intermediate polymerization stage between the initial polymerization stage and the final polymerization stage. The at least one intermediate polymerization stage may comprise any suitable conditions to induce polymerization. In some embodiments, the at least one intermediate polymerization stage comprises adding a crosslinker to the mixture. In some embodiments, the at least one intermediate polymerization stage comprises a time-dependent transition or a temperature-dependent transition. As used herein, a time-dependent transition means a time period, such as a time delay, that induces a distinct polymerization stage. As used herein, a temperature-dependent transition means a temperature that induces a distinct polymerization stage.

Generally, the method may comprise any suitable number of polymerization stages known in the art. In some embodiments, the method comprises one, two, three, four, five, or more than five polymerization stages. In some embodiments, the method comprises a number of polymerization stages in a range of from 2 to 5.

Generally, the first temperature may be any temperature that facilitates reaction. In some embodiments, the first temperature is in a range of from about −20° C. to about 40° C. In some preferred embodiments, the first temperature is 0° C. In some preferred embodiments, the first temperature is in a range of from about 20 to about 25° C.

Generally, the second temperature may be any temperature that facilitates reaction. In some embodiments, the second temperature is in a range of from about 20° C. to about 100° C. In some embodiments, the second temperature is in a range of from about 40° C. to about 70° C. In some preferred embodiments, the second temperature is in a range of from about 60° C. to about 70° C.

The method step of initiating a reaction may implement standard materials and procedures known in the art, including adding an initiator, an accelerator, or a combination thereof to the mixture. In some particular embodiments, the initiator is an oxidizing agent.

The initiator may be an organic compound. In some embodiments, the initiator is selected from the group consisting of azo compounds, organic peroxide compounds, organic persulfate compounds, and combinations thereof.

The initiator may be an inorganic compound. In some embodiments, the initiator is selected from the group consisting of inorganic peroxide compounds. In some particular embodiments, the initiator is selected from the group consisting of potassium persulfate, ammonium persulfate, and combinations thereof.

Some reactions may proceed at a suitable rate without an accelerator. When an accelerator is used, the accelerator is an organic compound. In some embodiments, the accelerator is selected from the group consisting of organic compounds, organic bases, tetramethylethylenediamine (TEMED), sodium metabisulfite (SPS), no accelerator, and combinations thereof.

An inert atmosphere improves the reaction by limiting oxidation by air. Inert atmospheres can be static or dynamic. When the inert atmosphere is dynamic, an inert gas is continually flowed over the reactants. The inert atmosphere comprises a chemically inert gas. In some embodiments, the inert atmosphere is selected from the group consisting of $N_2$, $CO_2$, noble gases, helium, neon, argon, krypton, xenon, and combinations thereof. In some particular embodiments, the method step of reacting the mixture comprises reacting the mixture in an inert atmosphere of $N_2$.

In some embodiments, the method further comprises drying the reaction product. The reaction product may be dried in an oven or with other known means of drying. Drying temperatures and times may be varied according to the relative moisture content and properties of the reaction product. In some embodiments, the method further comprises drying the reaction product at a temperature in the range of about 50° C. to about 100° C. In some particular embodiments, the method further comprises drying the reaction product at a temperature in the range of about 70° C. to about 90° C.

In some embodiments, the method further comprises grinding the reaction product. The reaction product is ground to break the reaction product down to desired particle sizes. Suitable methods are known in the art. In some embodiments, the method further comprises grinding the reaction product with a grinding device selected from the group consisting of a mechanical blender, coffee grinder, a crusher, a pulveriser, a grinder, a mill, and combinations thereof.

In another aspect of the disclosure, the particles as described in the current disclosure can undergo further treatment according to well-known procedures such as particle surface cross-linking. The proper selected surface cross-linking agents can enhance the particle mechanical strength as well as helping to control intake speed, improve gel permeability, and fluid distribution between the particles and inside of the given particle.

Regarding the properties of the final superabsorbent polymers, the ability of a polymer to absorb fluid under a static load can be measured as absorbance under load (AUL). A typical AUL test format may be used. The capacity of a pre-swollen polymer to retain water under force can be measured as centrifuge retention capacity (CRC). A typical CRC test format may be used.

Consumer products or superabsorbent materials may comprise the superabsorbent polymers in accordance with the present disclosure. The superabsorbent polymer may also be used in a consumer product or a superabsorbent material.

Suitable consumer products include, but are not limited to, personal hygiene products, wipes, napkins, bibs, disposable bed liners, wound dressings, food packaging, baby and adult diaper products, child training pants, feminine pads and napkins, arm bands, agricultural and pet products that contain superabsorbent ingredients, disposable absorbent products, and combinations thereof.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Measurement Techniques.

Polymers according to the present disclosure and examples were measured to determine their absorbency under load (AUL) and centrifuge retention capacity (CRC) properties.

Technique 1. AUL Measurements of SAM Particles

AUL measures the ability of a polymer to absorb fluid under a static load and can be considered as a measurement of gel swelling coupled with gel strength. A typical AUL test format was used, consisting of a simple cylindrical device with a macro-porous sintered filter plate at one end of a sintered plastic cylinder. For the samples tested, 160 mg ($W_1$) of the dried SAP sample was weighed and evenly placed on the surface of polyester gauze placed on top of the sintered plastic. The desired load (e.g. a weight that can generate pressures of 0.3-0.9 PSI) was then placed on top of the dry SAP particles, with the load designed so it can freely move in the plastic cylinder. The device was placed in a petri dish of 0.9% saline solution on the top of a mesh (to ensure that water can access the bottom of the sintered plastic) for 1-72 hours or any desired measurement times. The swollen sample was weighed ($W_2$), and the AUL was calculated using Equation 1:

$$AUL\left(\frac{g}{g}\right) = \frac{W_2 - W_1}{W_1}. \quad \text{(Equation 1)}$$

Technique 2. CRC Measurements of SAM Particles

In contrast to AUL testing, in which a dry powder of SAP is hydrated under load, a CRC test measures the capacity of a pre-swollen SAP to retain water under force. To perform the test, about 100 to 200 mg ($W_1$) of the dried SAP sample was weighed into a pre-weighed tea bag. The tea bag was immersed in 0.9 wt % saline solution for 1-2 hours or any desired length of testing times to swell the SAP. Subsequently, the tea bag was placed inside a cylindrical centrifuge tube containing a porous inside to allow for water drainage and centrifuged for 3 minutes at 1600 rpm. As a control, an empty tea bag also was put in saline and centrifuged at the same speed. After centrifugation, the tea bag was weighed again ($W_2$), and the difference between the dried and swollen sample was calculated. The CRC amount was calculated by Equation 2:

$$CRC\left(\frac{g}{g}\right) = \frac{W_2 - W_1}{W_1}. \quad \text{(Equation 2)}$$

SAMs Copolymerized with Select Stable Inorganic Salts

The following examples are used to demonstrate non-staged copolymerization methods of making SAMs copolymerized with select inorganic salts. These methods and resulting polymers are known in the art, for example in PCT/US2020/053003, which is incorporated herein by reference.

Select stable inorganic salts (e.g. various inorganic salts including a metal ion with an oxidation state of at least 2) were copolymerized with acrylic acid sodium salt (e.g. the primary component of the current base monomer for commercial SAMs). Samples synthesized without these salts under identical polymerization conditions were used as controls.

Comparative Example 1. Preparation of PAA-Based SAM Particles without a Metal Ion with an Oxidation State of at Least 2

15 grams of acrylic acid (AA) monomer is added to a glass reaction flask (e.g. a 120 mL wide mouth round jar, a beaker, or a round bottom flask) with a magnetic stir bar. The glass reaction flask should be equipped with a seal cap or a glass or rubber stopper. About 45 mLs of deionized (DI) water is added to the glass reaction flask with AA monomer and then cooled down to about 0° C. with an ice water bath. After cooling, 5.84 g of NaOH pellets at greater than 97% purity is added to the cold solution. Then the mixture is stirred with a magnetic stirrer until the NaOH pellets were fully dissolved. The dissolution normally takes about 10-20 minutes under stirring. Alternatively, the neutralization can be done by dropwise addition of a pre-prepared NaOH aqueous solution to an AA/water mixture with the final total water volume being the same.

The mixture is rigorously degassed with either high purity nitrogen or argon to remove trapped air in the reaction mixture and also replace the air in the glass reaction flask. At least 5-10 minute degassing times are recommended. After about 5 minutes into the degassing step, an initiator (about 45 mg of 99.99% Potassium Persulfate (KPS)) and a cross-linker (about 68 mg of greater than 99% MBAA (N·N-MethyleneBis (Acrylamide)), both pre-dissolved in 4 mL of deionized water at room temperature, were added to the cold neutralized AA solution in DI-water. Then the degassing process was continued.

The glass reaction flask is then sealed and transferred to a pre-heated water bath equipped with a magnetic stirrer to start the single step thermal radical polymerization process. The polymerization temperature is controlled in the range of about 60 to about 70° C., and is more specifically about 65° C. The flask is either placed directly into a pre-heated bath or placed into a temperature bath that starts at room temperature and is gradually increased to about 65° C. or any desired final polymerization temperature The gelling time is monitored (e.g. by determining when the magnetic stir bar stops stirring). The gelling for control samples (e.g. solutions become viscous and then the stir bars stop stirring) can be observed only when the temperature reaches above 50-65° C. for at least 5-20 mins. After gelling, the gel remains in the heating bath for an additional 4 hours to ensure the completion of the polymerization.

After polymerization, the gel is removed from the glass reaction flask. A knife or a scissor is used to cut the big gel block into small chunks for easy drying. A blender can be used for breaking up the big gel block to small pieces. After cutting, the resulted gel chunks are dried in an 85° C. oven for at least 24-48 hours. The drying can also be done by accelerated drying procedures, with air dryers, with desired oven temperatures, with hot air flows, and combinations thereof. The drying process can also be performed through a dynamic belt system with a combination of heat, vacuum, and through air drying techniques.

Dried gel chunks are then placed into a coffee blender or any suitable tool for breaking down to desired particle sizes. US Standard sieves are used to collect particles with desired size ranges (e.g. 300-600 microns).

Comparative Example 2. Preparation of PAA-Based SAM Particles with a Metal Ion with an Oxidation State of at Least 2

The reaction procedure of Comparative Example 1 is followed, with the exception that after the degassing step, a desired amount of selected metal salts is added to the mixtures and then degassing is continued for another 5-10 minutes.

Staged Polymerization for SAMs Copolymerized with Select Inorganic Salts

The following examples are used to demonstrate the feasibility of staged polymerization for making SAMs copolymerized with select inorganic salts.

Example 1. Staged Polymerization with Iron (II) Chloride

A two-stage polymerization was performed with two monomers AA (30%) and AANa (70%) with MBAA as a crosslinker and KPS as a radical polymerization initiator. A selected and redox active inorganic salt $FeCl_2$ was used to initiate a Stage 1 co-polymerization at an ice bath temperature of about 0° C. to form a Stage 1 network. After desired reaction times of Stage 1, the temperature was raised to 65° C. to complete the co-polymerization by conventional radical polymerization to form a Stage 2 network. Table 1 summarizes the capacity data from different $FeCl_2$ loading levels and it clearly demonstrates that a small amount of $FeCl_2$ can lead to significant capacity increases, particularly for CRC. However, Table 1 also shows that too much $FeCl_2$ is not desirable as it can lead to capacity decreases. This is because excess redox $FeCl_2$ can quench the polymerization by directly reacting (e.g. consuming) with initiators to form stable oxidized iron (III) salts. The total quenching of polymerization was confirmed by adding excess $FeCl_2$ as no polymerization was observed when the loading levels exceed 30-40 mg.

Based on these data, desirable amounts of $FeCl_2$ are between 0.000066 and 0.1 percent by weight of the Stage 1 mixture, with an optimal CRC increase observed at about 0.083 percent by weight of the Stage 1 mixture. Preferred amounts of $FeCl_2$ are between 0.05 to 0.1 percent by weight of the Stage 1 mixture.

TABLE 1

Capacity data for staged polymerization with iron(II) chloride.

| AA (g) | KPS (g) | MBAA (g) | $FeCl_2$ (mg) | CRC (g/g) | CRC Increase (%) | AUL (0.9 PSI) (2 hr) | AUL (0.9 PSI) (>72 hrs) |
|---|---|---|---|---|---|---|---|
| 15 | 0.045 | 0.068 | 0 | 37.9 | Control | 9.5 | 25.7 |
| 15 | 0.045 | 0.068 | 0.01 | 39.5 | 4.5 | 10.4 | 26.0 |
| 15 | 0.045 | 0.068 | 0.10 | 40.7 | 7.7 | 10.1 | 26.0 |
| 15 | 0.045 | 0.068 | 1.0 | 42.6 | 12.5 | 10.6 | 26.6 |
| 15 | 0.045 | 0.068 | 2.0 | 46.3 | 22.3 | 10.1 | 26.5 |
| 15 | 0.045 | 0.068 | 4.0 | 47.8 | 26.2 | 9.7 | 26.4 |
| 15 | 0.045 | 0.068 | 8.0 | 49.7 | 31.4 | 10.1 | 26.0 |
| 15 | 0.045 | 0.068 | 12.6 | 51.6 | 35.3 | 9.1 | 24.5 |
| 15 | 0.045 | 0.068 | 15.0 | 46.7 | 23.2 | 8.6 | 23.0 |
| 15 | 0.045 | 0.068 | 20.0 | 30.8 | −18.7 | 8.2 | 18.7 |

Example 2. Varying Crosslinker Addition Time in a Staged Polymerization Process

A three-stage polymerization was performed with two monomers AA (30%) and AANa (70%) with KPS as a radical polymerization initiator. MBAA was added as a crosslinker at different times for forming Stage 1, Stage 2, and Stage 3 networks. A selected and redox active inorganic salt $FeCl_2$ was used to initiate the Stage 1 co-polymerization at an ice bath temperature of about 0° C. to form a Stage 1 network and then a Stage 2 network was formed by adding crosslinker MBAA at desired times. After desired reaction times of Stage 2, the temperature was raised to 65° C. to complete the co-polymerization by conventional radical polymerization to form a Stage 3 network. Table 2 clearly demonstrates that varying addition times of crosslinker can potentially lead to higher capacity SAM materials.

TABLE 2

Impact of crosslinker addition time to SAM capacity in staged polymerization process.

| AA (g) | KPS (g) | $FeCl_2$ (mg) | MBAA Addition Time after $FeCl_2$ (g) | MBAA After $FeCl_2$ (g) | CRC (g/g) | (CRC Increase %) | AUL (0.9 PSI) (2 hr) | AUL (0.9 PSI) (>72 hrs) |
|---|---|---|---|---|---|---|---|---|
| 15 | 0.045 | 0 | 0 | 0.068 | 37.9 | Control | 9.5 | 25.7 |
| 15 | 0.045 | 4.0 | 2 | 0.068 | 48.0 | 26.6 | 9.4 | 25.9 |
| 15 | 0.045 | 4.0 | 8 | 0.068 | 52.0 | 37.2 | 9.6 | 25.3 |
| 15 | 0.045 | 4.0 | 16 | 0.068 | 53.4 | 40.9 | 9.3 | 23.8 |

Example 3. Varying Crosslinker Amount and Addition Time in a Staged Polymerization Process A three-stage polymerization was performed with two monomers AA (30%) and AANa (70%) with KPS as a radical polymerization initiator. MBAA was added as a crosslinker at different times and in different ratios for forming Stage 1 and Stage 2 networks. A selected redox active inorganic salt $FeCl_2$ was used to initiate the Stage 1 co-polymerization at ice bath temperature at about 0° C. to form a Stage 1 network and then crosslinker MBAA was added at desired times and loading levels to form a Stage 2 network. After desired reaction times of Stage 2, the temperature was raised to 65° C. to complete the co-polymerization by conventional radical polymerization to form a Stage 3 network. Table 3 clearly demonstrates that varying both the amount and addition time of the crosslinker MBAA can potentially lead to higher capacity materials.

TABLE 3

Impact of crosslinker addition time to SAM capacity in staged polymerization process.

| AA (g) | KPS (g) | MBAA Before FeCl$_2$ (g) | FeCl$_2$ (mg) | MBAA 5 mins After FeCl$_2$ (g) | CRC (g/g) | CRC Increase (%) | AUL (0.3 PSI) (2 hr) | AUL (0.3 PSI) (>72 hrs) | AUL (0.9 PSI) (2 hr) | AUL (0.9 PSI) (>72 hrs) |
|---|---|---|---|---|---|---|---|---|---|---|
| 15 | 0.045 | 0.068 | 0 | 0.0 | 37.9 | Control | 10.6 | 29.5 | 9.5 | 25.7 |
| 15 | 0.045 | 0.068 | 4.0 | 0.0 | 49.7 | 31.1 | 11.1 | 33.6 | 10.4 | 28.5 |
| 15 | 0.045 | 0.034 | 4.0 | 0.034 | 51.9 | 36.9 | 10.8 | 33.9 | 9.91 | 28.0 |
| 15 | 0.045 | 0.0 | 4.0 | 0.068 | 54.7 | 44.3 | 10.5 | 33.1 | 9.6 | 24.9 |

Example 4. Control Achieved by a Staged Polymerization Process

Staged polymerization may be used to control each stage's structure and its overall mass percentage in the final polymer by the precise control of each stage's polymerization time. FeCl$_2$ and KPS were used to initiate the co-polymerization of acrylic acid (about 30%) and acrylic acid sodium salt (about 70%) at an ice bath temperature of about 0° C. to form a Stage 1 network and then the polymerization was quenched by the pouring reaction mixture into methyl alcohol at desired polymerization times. The precipitated polymer solid was then collected and dried to quantify the mass percentage of Stage 1 in the final polymer. Dried samples were found to be soluble in water, which indicates their nature of constituting mainly the non-crosslinked long chain polymers. Solubility properties are shown in Table 4.

TABLE 4

Time dependence of Stage 1 polymerization without added crosslinker MBAA in staged polymerization process.

| Time for quenching the polymerization with MeOH (mins) | 2 | 4 | 8 | 16 |
|---|---|---|---|---|
| Weight of initial monomers (AA 30% and AANa 70%) | 18.21 | 18.21 | 18.21 | 18.21 |
| Recovered Network 1 (grams after dried) | 1.01 | 2.10 | 3.24 | 5.44 |
| Percentage of Stage 1 network in total polymer | 5.55 | 11.53 | 17.79 | 29.87 |
| Solubility in water | Yes | Yes | Yes | Yes |
| Stage 1 network structure | Mainly Oligomers | Mainly Oligomers | Mainly Oligomers | Mainly Oligomers |

Polymer property parameters including molecular weight (weight fractions Mw, chain number fractions Mn, Z fractions Mz), polydispersity (Mw/Mn), Hydrodynamic Radius (Rh), Inherent Viscosity (IV), and MK Alpha were determined and are listed in Table 5. Table 5 clearly demonstrates that longer reaction times lead to longer polymer chains, which should be expected to have higher capacities, particularly for CRC, because of low restrictions of traditional crosslinking. The data of Tables 4 and 5 support and confirm each other.

TABLE 5

Stage 1 polymer property parameters.

| Quenching time (mins) | Mw (g/mol) | Mn (g/mol) | Mz (g/mol) | Mw/Mn | IV (ml/g) | Rh (nm) | MK alpha |
|---|---|---|---|---|---|---|---|
| 2 | 230,367 | 128,400 | 614,367 | 1.80 | 135.7 | 26.2 | 0.752 |
| 4 | 465,367 | 209,567 | 1,313,000 | 2.23 | 220.2 | 40.8 | 0.735 |
| 8 | 942,300 | 431,567 | 2,167,000 | 2.18 | 368.2 | 56.6 | 0.694 |
| 16 | 1,219,667 | 574,500 | 2,777,000 | 2.14 | 431.6 | 63.5 | 0.666 |
| P(AANa) Std 245K | 248,200 | 168,800 | 381,100 | 1.47 | 121.70 | 20.40 | 0.638 |

Example 5. Polymerization with Three Monomers with Delayed Addition of Crosslinker MBAA A two-stage polymerization was performed with three monomers AA (30%), AANa (70%), and VSO$_3$Na (vinylsulfonic acid sodium salt) with MBAA as a crosslinker and KPS as a radical polymerization initiator. A selected and redox active inorganic salt FeCl$_2$ was used to initiate the Stage 1 co-polymerization at an ice bath temperature of about 0° C. without crosslinker MBAA to form a Stage 1 network. After a desired reaction time of 10 minutes, the crosslinker was added to the polymerization mixture and then the temperature was raised to 65° C. to complete the co-polymerization by conventional radical polymerization to form a Stage 2 network. Results are shown in Table 6.

TABLE 6

Polymerization with three monomers with delayed addition of crosslinker MBAA (after 10 minutes of polymerization started).

| AA (g) | VSO$_3$Na (g) | KPS (g) | MBAA (g) | FeCl$_2$ (mg) | CRC (g/g) (2 hours) |
|---|---|---|---|---|---|
| 15 | 0.75 | 0.045 | 0.068 | 0 | 47.3 |
| 15 | 0.75 | 0.045 | 0.068 | 0.01 | 46.4 |
| 15 | 0.75 | 0.045 | 0.068 | 0.10 | 50.2 |
| 15 | 0.75 | 0.045 | 0.068 | 1.0 | 53.8 |

Comparative Example 3. Staged Polymerization with Non-Redox SISs

Non-redox SISs cannot induce a staged polymerization process. Non-redox active salts $CaCl_2$, $Al_2(SO_4)_3$, and $FeCl_3$ were added to the polymerization mixture with the same procedure as used for redox active salt $FeCl_2$ at an ice bath temperature of about 0°. Unlike $FeCl_2$, no polymerization was observed, regardless of how long the reaction mixture was maintained and stirred at this temperature. Polymerization only occurs when the temperature was raised to conventional thermal radical polymerization temperature, e.g. above 50-65° C., and this leads to final polymers with uniform structure.

Comparative Example 4. Staged Polymerization without a Select Inorganic Salt (SIS)

Staged polymerization was performed with a control sample that does not have an added SIS. The polymerization mixture was prepared with two monomers AA (30%) and AANa (70%) with MBAA as a crosslinker and KPS as a radical polymerization initiator at an ice bath temperature of about 0° C. No polymerization was observed, regardless how long the reaction mixture was maintained and stirred at this temperature. The polymerization only occurs when the temperature was raised to normal thermal radical polymerization temperature, e.g. above 50-65° C., and this leads to final polymers with uniform structure.

Example 6. Synergistic Impact of a Redox Active SIS ($FeCl_2$) and a Stable SIS ($FeCl_3$)

Potential synergistic benefits of applying both redox active SISs and stable SISs to staged polymerization were demonstrated. A stable SIS $FeCl_3$ (with different loading levels) was first added to a pre-polymerization mixture and then a redox active SIS $FeCl_2$ (with a fixed loading level) was then added to initiate the polymerization process at ice bath temperature. After forming a first stage at low temperature, a second stage and a third stage can be achieved by gradually increasing the polymerization temperature to a conventional thermal radical polymerization temperature, e.g. above 50-65° C. Table 7 clearly demonstrates that synergistic benefits can be achieved by combining both stable and redox active SISs in a staged polymerization process.

TABLE 7

Synergistic impact of a redox active SIS ($FeCl_2$) and a stable SIS ($FeCl_3$).

| AA (g) | KPS (g) | MBAA (g) | FeCl₃ (mg) | FeCl₂ (mg) | CRC (g/g) | CRC Increase (%) |
|---|---|---|---|---|---|---|
| 15 | 0.045 | 0.068 | 0 | 0 | 37.9 | Control |
| 15 | 0.045 | 0.068 | 1.0 | 5.0 | 49.3 | 30.1 |
| 15 | 0.045 | 0.068 | 5.0 | 5.0 | 49.8 | 31.4 |
| 15 | 0.045 | 0.034 | 10.0 | 5.0 | 50.8 | 34.0 |
| 15 | 0.045 | 0.0 | 20.0 | 5.0 | 53.2 | 40.4 |

Example 7. Mechanical Property Comparison

Staged SAMs have distinctive swelling kinetics in comparison to uniformly crosslinked SAMs. Different crosslinking density in Stage 1 and Stage 2 exhibit a mechanical strength transition during swelling in saline solutions. A drop of mechanical strength during swelling is expected when liquid reaches lower crosslinking density domains, particularly inside the SAM particles. This will be more profound for less or no crosslinkers in Stage 1 by design.

A gel strength measurement instrument, such as an ElastoSens™ Bio instrument, can be used to measure SAM particle mechanical properties during dynamic swelling.

Sample measurements were taken with the following procedure. 0.1 g SAM particles were placed in an ElastoSense™ Bio sample cup and then the cup was placed into the ElastoSense™ Bio sample measurement chamber. 5 mLs of 0.9% NaCl solution were added to the sample cup and then the free swelling kinetics were recorded for 30 seconds intervals for 30 minutes to 1 hour.

Figure 4:
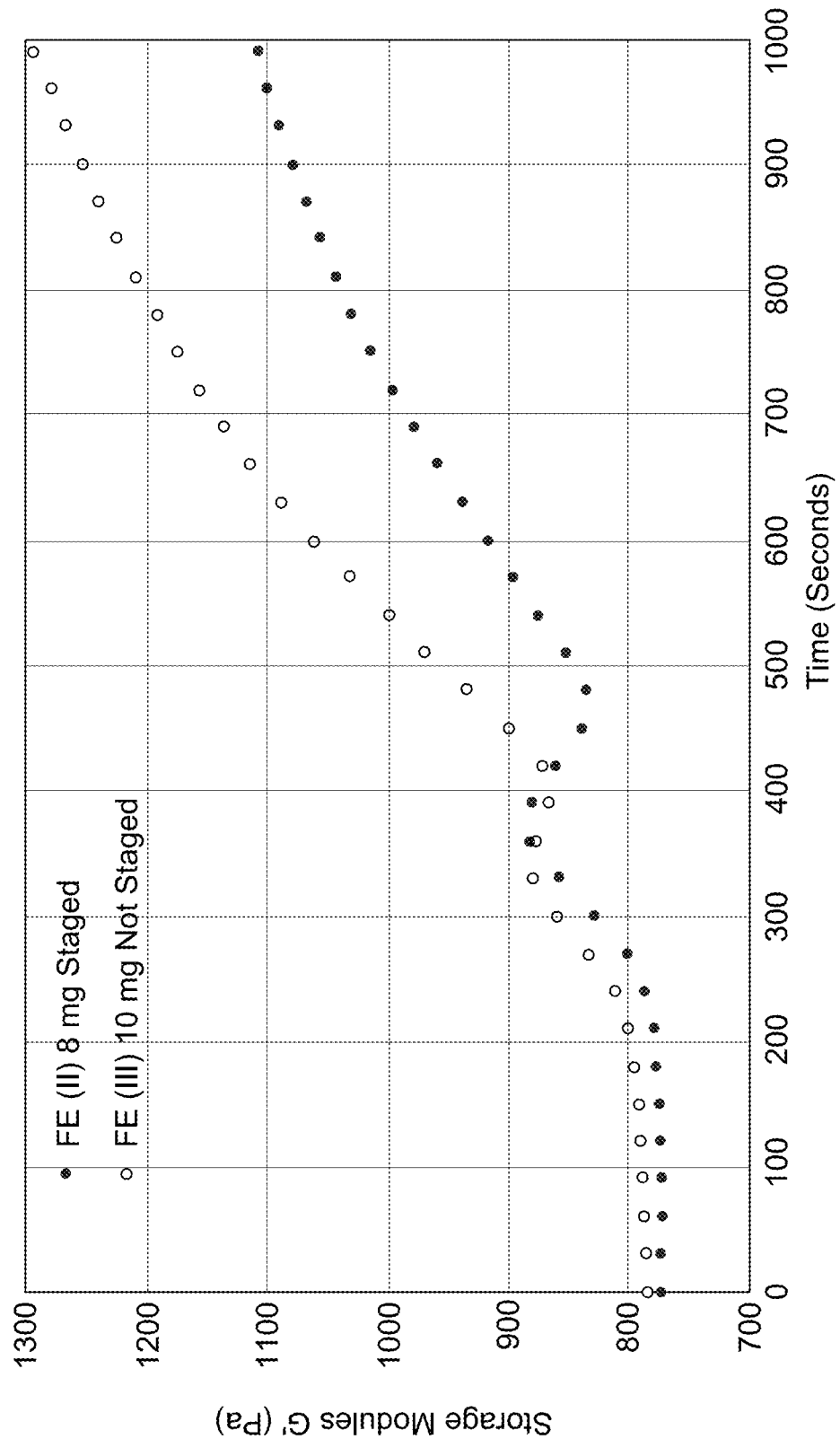
FIG. 4 is an exemplary embodiment in accordance with the present disclosure depicting storage modulus data for polymers produced by staged polymerization and polymers not produced by staged polymerization.

Storage modulus data for polymers produced by staged polymerization and polymers not produced by staged polymerization are shown in FIG. 4. The polymers produced by staged polymerization exhibit an initial decrease in storage modulus caused by liquid reaching low crosslinking density domains on particle surfaces, and also a large decrease in storage modulus between 300 and 500 seconds caused by liquid reaching low crosslinking density domains inside the particles. In contrast, the polymers not produced by staged polymerization exhibit an initial increase in storage modulus and no large decrease in storage modulus between 300 and 500 seconds.

In particular, the superabsorbent polymer produced by staged polymerization provides a 5.2% reduction in storage modulus (G) from about 883 Pa to about 837 Pa over a time period from about 360 seconds to about 480 seconds. The superabsorbent polymer not produced by staged polymerization only provides a 1.5% reduction in storage modulus (G) from about 882 Pa to about 869 Pa over a time period from about 330 seconds to about 390 seconds.

Figure 5:
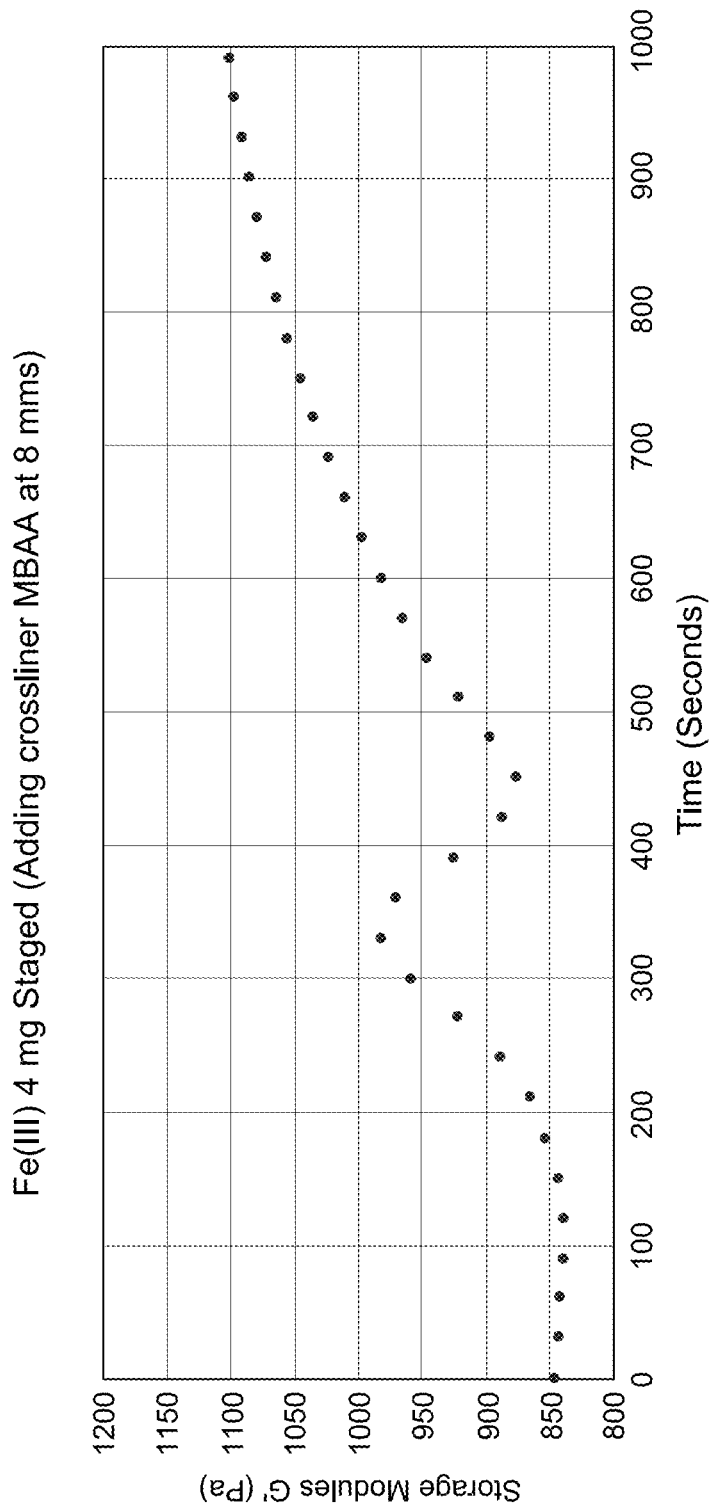
FIG. 5 is an exemplary embodiment in accordance with the present disclosure depicting storage modulus data for polymers produced by staged polymerization.

Additional storage modulus data for polymers produced by staged polymerization are shown in FIG. 5. The polymers produced by staged polymerization exhibit an initial decrease in storage modulus caused by liquid reaching low crosslinking density domains on particle surfaces, and also a large decrease in storage modulus between 300 and 500 seconds caused by liquid reaching low crosslinking density domains inside the particles.

In particular, the superabsorbent polymer produced by staged polymerization provides a 10.8% reduction in storage modulus (G') from about 983 Pa to about 876.5 Pa over a time period from about 330 seconds to about 450 seconds.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including." "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause: other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A superabsorbent polymer comprising:
a polymer backbone comprising:
a neutralized backbone monomer;
a neutralized backbone monomer complexed with a coordination complex comprising a metal ion with an oxidation state of at least 2;
optionally an un-neutralized backbone monomer; and
optionally an un-neutralized backbone monomer complexed with a coordination complex comprising a metal ion with an oxidation state of at least 2; and
optionally a crosslinker;
wherein the superabsorbent polymer comprises a non-homogenous microstructure.

2. The superabsorbent polymer of claim 1, wherein the superabsorbent polymer is configured to provide at least a 5.2% reduction in storage modulus (G') between 300 seconds and 500 seconds after exposure to a 0.9% NaCl solution at room temperature.

3. The superabsorbent polymer of claim 1, wherein the superabsorbent polymer comprises a core-shell polymer microstructure.

4. The superabsorbent polymer of claim 1, wherein the superabsorbent polymer comprises a first polymer portion comprising a first crosslinking density and a second polymer portion comprising a second crosslinking density, wherein the first crosslinking density and the second crosslinking density are different.

5. The superabsorbent polymer of claim 1, wherein the superabsorbent polymer comprises a first polymer portion present in an amount in the range of from about 1 to about 30 weight percent of the superabsorbent polymer and a second polymer portion present in an amount in the range of from about 60 to about 99 weight percent of the superabsorbent polymer.

6. The superabsorbent polymer of claim 1, wherein the superabsorbent polymer is in a form selected from the group consisting of a particle, a gel, a fiber, a bead, a liquid, a solid, a paste, or combinations thereof.

7. The superabsorbent polymer of claim 1, wherein the superabsorbent polymer is in the form of a particle with a diameter in the range of about 100 μm to about 1000 μm.

8. A method of making a superabsorbent polymer comprising:
an initial polymerization stage comprising
forming a mixture comprising
a solvent;
a monomer;
a salt comprising a redox active metal ion;
optionally a crosslinker; and
an initiator; and
reacting the mixture at a first temperature; and
a final polymerization stage comprising
optionally adding a crosslinker to the mixture;
heating the mixture from the first temperature to a second temperature; and
reacting the mixture at the second temperature;
wherein the superabsorbent polymer comprises a non-homogenous microstructure.

9. The method of claim 8, further comprising at least one intermediate polymerization stage between the initial polymerization stage and the final polymerization stage.

10. The method of claim 9, wherein the at least one intermediate polymerization stage comprises a time-dependent transition or a temperature-dependent transition.

11. The method of claim 10, wherein the at least one intermediate polymerization stage comprises adding a crosslinker to the mixture.

12. The method of claim 8, wherein the mixture further comprises a stable salt comprising a metal ion with an oxidation state of at least 2.

13. The method of claim 8, wherein the method comprises a number of polymerization stages in a range of from 2 to 5.

14. The method of claim 8, wherein the first temperature is in a range of from about −20° C. to about 40° C.

15. The method of claim 8, wherein the second temperature is in a range of from about 40° C. to about 70° C.

16. The method of claim 8, wherein the method further comprises drying the reaction product.

17. The method of claim 8, wherein the method further comprises grinding the reaction product.

18. A method of using a superabsorbent polymer comprising
a polymer backbone comprising:
a neutralized backbone monomer;
a neutralized backbone monomer complexed with a coordination complex comprising a metal ion with an oxidation state of at least 2;

optionally an un-neutralized backbone monomer; and
optionally an un-neutralized backbone monomer complexed with a coordination complex comprising a metal ion with an oxidation state of at least 2; and
optionally a crosslinker;
wherein the superabsorbent polymer comprises a non-homogenous microstructure, the method comprising using the superabsorbent polymer in a consumer product.

19. The method of claim 18, wherein the superabsorbent polymer is in the form of a particle with a diameter in the range of about 100 μm to about 1000 μm.

20. The method of claim 18, wherein the consumer product is selected from the group consisting of personal hygiene products, wipes, napkins, bibs, disposable bed liners, wound dressings, food packaging, baby and adult diaper products, child training pants, feminine pads and napkins, arm bands, agricultural and pet products that contain superabsorbent ingredients, disposable absorbent products, and combinations thereof.

* * * * *